(12) United States Patent
Nguyen et al.

(10) Patent No.: US 11,245,354 B2
(45) Date of Patent: Feb. 8, 2022

(54) SOLAR ROOF TILE SPACER WITH EMBEDDED CIRCUITRY

(71) Applicant: TESLA, INC., Palo Alto, CA (US)

(72) Inventors: Peter P. Nguyen, Hayward, CA (US); Piotr Zajac, Foster City, CA (US)

(73) Assignee: Tesla, Inc., Austin, TX (US)

( * ) Notice: Subject to any disclaimer, the term of this patent is extended or adjusted under 35 U.S.C. 154(b) by 135 days.

(21) Appl. No.: 16/050,994

(22) Filed: Jul. 31, 2018

(65) Prior Publication Data

US 2020/0044599 A1 Feb. 6, 2020

(51) Int. Cl.
*H02S 20/25* (2014.01)
*H02S 30/10* (2014.01)
*H02S 40/36* (2014.01)

(52) U.S. Cl.
CPC ............. *H02S 20/25* (2014.12); *H02S 30/10* (2014.12); *H02S 40/36* (2014.12)

(58) Field of Classification Search
CPC ...................................................... H01L 51/44
See application file for complete search history.

(56) References Cited

U.S. PATENT DOCUMENTS

| | | |
|---|---|---|
| 352,424 A | 11/1886 | Owen et al. |
| 3,076,861 A | 2/1963 | Samulon |
| 3,369,939 A | 2/1968 | Myer |
| 3,459,391 A | 8/1969 | Haynos |
| 3,461,602 A | 8/1969 | Heinz |
| 4,040,867 A | 8/1977 | Forestieri et al. |
| 4,239,810 A | 12/1980 | Alameddine |
| 4,336,413 A | 6/1982 | Tourneux |

(Continued)

FOREIGN PATENT DOCUMENTS

| | | |
|---|---|---|
| CN | 102544380 | 8/2015 |
| CN | 103426957 | 3/2016 |

(Continued)

OTHER PUBLICATIONS

Fan et al., "Laser micromachined wax-covered plastic paper as both sputter deposition shadow masks and deep-ultraviolet patterning masks for polymethylmacrylate-based microfluidic systems" via google scholar, downloaded Mar. 31, 2016.

(Continued)

*Primary Examiner* — Tae-Sik Kang
(74) *Attorney, Agent, or Firm* — Dentons US LLP

(57) ABSTRACT

One embodiment can provide a photovoltaic roof tile module. The photovoltaic roof tile module can include a first photovoltaic roof tile and a second photovoltaic roof tile positioned adjacent to each other and a spacer coupled to and positioned between the first and second photovoltaic roof tiles. A respective photovoltaic roof tile can include a front glass cover and a back cover, which includes a glass substrate and a pre-laid circuit attached to the glass substrate. The pre-laid circuit is electrically coupled to the plurality of photovoltaic structures. The spacer can include a thermal plastic body and one or more metallic strips embedded within the thermal plastic body, and both ends of a respective metallic strip extend beyond edges of the thermal plastic body to facilitate electrical coupling between pre-laid circuits of the first and second photovoltaic roof tiles.

9 Claims, 16 Drawing Sheets

(56) References Cited

U.S. PATENT DOCUMENTS

| | | | |
|---|---|---|---|
| 4,400,577 A * | 8/1983 | Spear | B32B 17/10009 |
| | | | 136/259 |
| 4,623,753 A | 11/1986 | Feldman et al. | |
| 4,724,011 A | 2/1988 | Turner | |
| 4,946,512 A | 8/1990 | Fukuroi et al. | |
| 5,112,408 A | 5/1992 | Melchior | |
| 5,118,540 A | 6/1992 | Hutchison | |
| 5,316,592 A | 5/1994 | Dinwoodie | |
| 5,338,369 A | 8/1994 | Rawlings | |
| 5,427,961 A | 6/1995 | Takenouchi | |
| 5,437,735 A | 8/1995 | Younan et al. | |
| 5,482,569 A | 1/1996 | Ihara et al. | |
| 5,571,338 A | 11/1996 | Kadonome et al. | |
| 5,575,861 A | 11/1996 | Younan et al. | |
| 5,590,495 A | 1/1997 | Bressler et al. | |
| 5,596,981 A | 1/1997 | Soucy | |
| 5,667,596 A | 9/1997 | Tsuzuki | |
| 5,701,067 A | 12/1997 | Kaji et al. | |
| 5,919,316 A | 7/1999 | Bogorad et al. | |
| 5,942,048 A | 8/1999 | Fujisaki | |
| 6,093,884 A * | 7/2000 | Toyomura | H02S 40/34 |
| | | | 136/244 |
| 6,133,522 A | 10/2000 | Kataoka | |
| 6,186,698 B1 | 2/2001 | Knapp | |
| 6,307,144 B1 | 10/2001 | Mimura et al. | |
| 6,311,436 B1 | 11/2001 | Mimura | |
| 6,365,824 B1 | 4/2002 | Nakazima | |
| 6,465,724 B1 | 10/2002 | Garvison et al. | |
| 6,472,594 B1 | 10/2002 | Ichinose | |
| 6,515,216 B2 | 2/2003 | Zenko et al. | |
| 6,586,271 B2 | 7/2003 | Hanoka | |
| 6,620,645 B2 | 9/2003 | Chandra et al. | |
| 6,670,541 B2 | 12/2003 | Nagao et al. | |
| 6,672,018 B2 | 1/2004 | Shingleton | |
| 6,883,290 B2 | 4/2005 | Dinwoodie | |
| 6,959,520 B2 | 11/2005 | Hartman | |
| 6,960,716 B2 | 11/2005 | Matsumi | |
| 7,012,188 B2 | 3/2006 | Erling | |
| 7,259,321 B2 | 8/2007 | Oswald | |
| 7,276,724 B2 | 10/2007 | Sheats | |
| 7,328,534 B2 | 2/2008 | Dinwoodie | |
| 7,506,477 B2 | 3/2009 | Flaherty | |
| 7,534,956 B2 | 5/2009 | Kataoka | |
| 7,772,484 B2 | 8/2010 | Li | |
| 7,833,808 B2 | 11/2010 | Xu | |
| 7,851,700 B2 | 12/2010 | Luch | |
| 7,858,874 B2 | 12/2010 | Ruskin | |
| 7,902,451 B2 | 3/2011 | Shimizu | |
| 7,964,440 B2 | 6/2011 | Salleo | |
| 8,141,306 B2 | 3/2012 | Masuda et al. | |
| 8,156,697 B2 | 4/2012 | Miros et al. | |
| 8,205,400 B2 | 6/2012 | Allen | |
| 8,206,664 B2 | 6/2012 | Lin | |
| 8,276,329 B2 | 10/2012 | Lenox | |
| 8,307,606 B1 | 11/2012 | Rego et al. | |
| 8,471,141 B2 | 6/2013 | Stancel | |
| 8,519,531 B2 | 8/2013 | Pilat et al. | |
| 8,601,754 B2 | 12/2013 | Jenkins et al. | |
| 8,664,030 B2 | 3/2014 | Luch | |
| 8,674,377 B2 | 3/2014 | Farquhar | |
| 8,697,981 B2 | 4/2014 | Adriani et al. | |
| 8,701,360 B2 | 4/2014 | Ressler | |
| 8,713,861 B2 | 5/2014 | Desloover | |
| 8,740,642 B2 | 6/2014 | Keenihan et al. | |
| 8,763,322 B2 | 7/2014 | Hamamura | |
| 8,822,810 B2 | 9/2014 | Luch | |
| 8,869,470 B2 | 10/2014 | Lanza | |
| 8,919,075 B2 | 12/2014 | Erickson | |
| 9,000,288 B2 | 4/2015 | Hoang et al. | |
| 9,012,763 B2 | 4/2015 | Frolov et al. | |
| 9,038,330 B2 | 5/2015 | Bellavia | |
| 9,150,966 B2 | 10/2015 | Xu | |
| 9,206,520 B2 | 12/2015 | Barr | |
| 9,343,592 B2 | 5/2016 | Hunt | |
| 9,356,173 B2 | 5/2016 | Okandan et al. | |
| 9,362,527 B2 | 6/2016 | Takemura | |
| 9,412,884 B2 | 8/2016 | Heng | |
| 9,412,890 B1 | 8/2016 | Meyers | |
| 9,435,568 B2 | 9/2016 | Smidt et al. | |
| 9,496,423 B2 | 11/2016 | Loeckenhoff et al. | |
| 9,496,819 B2 | 11/2016 | Hsueh et al. | |
| 9,518,391 B2 | 12/2016 | Haynes et al. | |
| 9,525,092 B2 | 12/2016 | Mayer | |
| 9,673,750 B2 | 6/2017 | Schoop et al. | |
| 9,685,579 B2 | 6/2017 | Gonzalez et al. | |
| 9,825,582 B2 | 11/2017 | Fernandes | |
| 9,882,077 B2 | 1/2018 | Morad et al. | |
| 9,899,554 B2 | 2/2018 | Yang | |
| 9,935,222 B1 | 4/2018 | Zhou et al. | |
| 9,954,480 B2 | 4/2018 | Haynes et al. | |
| 9,966,487 B2 | 5/2018 | Magnusdottir | |
| 10,056,522 B2 | 8/2018 | Gonzalez | |
| 10,145,116 B2 | 12/2018 | Holt et al. | |
| 10,151,114 B2 | 12/2018 | Stearns et al. | |
| 10,177,708 B2 | 1/2019 | Cruz | |
| 10,256,765 B2 | 4/2019 | Rodrigues et al. | |
| 10,461,685 B2 | 10/2019 | Anderson et al. | |
| 10,563,406 B2 | 2/2020 | Kalkanoglu et al. | |
| 2001/0054435 A1 | 12/2001 | Nagao | |
| 2002/0015782 A1 | 2/2002 | Abys | |
| 2003/0010377 A1 | 1/2003 | Fukuda et al. | |
| 2003/0180983 A1 | 9/2003 | Oswald | |
| 2004/0261840 A1 | 12/2004 | Schmit | |
| 2005/0022857 A1 | 2/2005 | Daroczi et al. | |
| 2005/0039788 A1 | 2/2005 | Blieske | |
| 2005/0268963 A1 | 12/2005 | Jordan | |
| 2006/0048798 A1 | 3/2006 | Mccoy | |
| 2006/0086620 A1 | 4/2006 | Chase | |
| 2006/0102380 A1 * | 5/2006 | Hu | H01B 3/445 |
| | | | 174/120 R |
| 2006/0204730 A1 | 9/2006 | Nakamura | |
| 2007/0011898 A1 | 1/2007 | Frank et al. | |
| 2008/0053511 A1 | 3/2008 | Nakamura | |
| 2008/0135085 A1 | 6/2008 | Corrales | |
| 2008/0149170 A1 * | 6/2008 | Hanoka | H02S 40/34 |
| | | | 136/251 |
| 2008/0231768 A1 | 9/2008 | Okabe | |
| 2008/0271773 A1 | 11/2008 | Jacobs et al. | |
| 2008/0302030 A1 | 12/2008 | Stancel et al. | |
| 2009/0101192 A1 | 4/2009 | Kothari | |
| 2009/0120497 A1 | 5/2009 | Schetty | |
| 2009/0133739 A1 | 5/2009 | Shiao | |
| 2009/0133740 A1 | 5/2009 | Shiao | |
| 2009/0233083 A1 | 9/2009 | Inoue | |
| 2009/0242021 A1 | 10/2009 | Petkie | |
| 2009/0287446 A1 | 11/2009 | Wang | |
| 2009/0308435 A1 | 12/2009 | Caiger | |
| 2010/0000603 A1 | 1/2010 | Tsuzuki | |
| 2010/0006147 A1 | 1/2010 | Nakashima | |
| 2010/0018568 A1 | 1/2010 | Nakata | |
| 2010/0116330 A1 * | 5/2010 | Inoue | H01L 31/02013 |
| | | | 136/256 |
| 2010/0132762 A1 | 6/2010 | Graham | |
| 2010/0147363 A1 | 6/2010 | Huang | |
| 2010/0147364 A1 | 6/2010 | Gonzalez et al. | |
| 2010/0180929 A1 | 7/2010 | Raymond | |
| 2011/0017278 A1 | 1/2011 | Kalkanoglu et al. | |
| 2011/0023937 A1 | 2/2011 | Daniel | |
| 2011/0023942 A1 | 2/2011 | Soegding | |
| 2011/0030761 A1 | 2/2011 | Kalkanoglu | |
| 2011/0047902 A1 | 3/2011 | Cryar | |
| 2011/0048507 A1 | 3/2011 | Livsey et al. | |
| 2011/0100436 A1 | 5/2011 | Cleereman et al. | |
| 2011/0155209 A1 | 6/2011 | Tober et al. | |
| 2011/0203637 A1 | 8/2011 | Patton et al. | |
| 2011/0253193 A1 | 10/2011 | Korman et al. | |
| 2011/0277825 A1 | 11/2011 | Fu | |
| 2011/0290307 A1 | 12/2011 | Workman et al. | |
| 2012/0000502 A1 | 1/2012 | Wiedeman et al. | |
| 2012/0012162 A1 | 1/2012 | Kobayashi | |
| 2012/0031470 A1 | 2/2012 | Dimov | |
| 2012/0048349 A1 | 3/2012 | Metin | |
| 2012/0060911 A1 | 3/2012 | Fu | |
| 2012/0125391 A1 | 5/2012 | Pinarbasi | |

(56) References Cited

U.S. PATENT DOCUMENTS

| | | |
|---|---|---|
| 2012/0199184 A1 | 8/2012 | Nie |
| 2012/0204927 A1 | 8/2012 | Peterson et al. |
| 2012/0237670 A1 | 9/2012 | Lim |
| 2013/0048062 A1 | 2/2013 | Min |
| 2013/0061913 A1 | 3/2013 | Willham |
| 2013/0098420 A1* | 4/2013 | Sherman ............... H02S 40/34 136/244 |
| 2013/0112239 A1 | 5/2013 | Liptac et al. |
| 2013/0160823 A1 | 6/2013 | Khouri |
| 2013/0206213 A1 | 8/2013 | He |
| 2013/0209776 A1 | 8/2013 | Kim |
| 2013/0233378 A1 | 9/2013 | Moslehi |
| 2013/0239495 A1 | 9/2013 | Galitev et al. |
| 2013/0247959 A1 | 9/2013 | Kwon |
| 2013/0255755 A1 | 10/2013 | Chich |
| 2013/0280521 A1 | 10/2013 | Mori |
| 2013/0284241 A1 | 10/2013 | Georgi et al. |
| 2014/0120699 A1 | 5/2014 | Hua |
| 2014/0124013 A1 | 5/2014 | Morad et al. |
| 2014/0124014 A1 | 5/2014 | Morad |
| 2014/0196768 A1 | 7/2014 | Heng et al. |
| 2014/0246549 A1 | 9/2014 | West et al. |
| 2014/0313574 A1 | 10/2014 | Bills |
| 2014/0360582 A1 | 12/2014 | Cui |
| 2015/0068582 A1 | 3/2015 | Chaney |
| 2015/0083191 A1 | 3/2015 | Gmundner |
| 2015/0090314 A1 | 4/2015 | Yang |
| 2015/0155824 A1 | 6/2015 | Chien |
| 2015/0194552 A1 | 7/2015 | Ogasahara |
| 2015/0243931 A1 | 8/2015 | Fukuura |
| 2015/0270410 A1 | 9/2015 | Heng |
| 2015/0349145 A1* | 12/2015 | Morad ................ H02S 30/00 136/261 |
| 2015/0349152 A1 | 12/2015 | Voss |
| 2015/0349703 A1 | 12/2015 | Morad |
| 2016/0013329 A1 | 1/2016 | Brophy |
| 2016/0105144 A1 | 4/2016 | Haynes |
| 2016/0163902 A1 | 6/2016 | Podlowski |
| 2016/0181446 A1 | 6/2016 | Kalkanoglu |
| 2016/0225931 A1 | 8/2016 | Heng |
| 2017/0033250 A1 | 2/2017 | Ballif |
| 2017/0077343 A1 | 3/2017 | Morad |
| 2017/0194516 A1 | 7/2017 | Reddy |
| 2017/0194900 A1 | 7/2017 | Erben et al. |
| 2017/0222082 A1 | 8/2017 | Lin |
| 2017/0256661 A1 | 9/2017 | Xu |
| 2017/0323808 A1 | 11/2017 | Gislon et al. |
| 2017/0358699 A1 | 12/2017 | Juliano et al. |
| 2018/0054157 A1 | 2/2018 | Kapla et al. |
| 2018/0166601 A1 | 6/2018 | Inaba |
| 2018/0254738 A1 | 9/2018 | Yang et al. |
| 2018/0316302 A1 | 11/2018 | Okawa et al. |
| 2018/0351501 A1 | 12/2018 | Seery et al. |
| 2018/0351502 A1 | 12/2018 | Almy et al. |
| 2019/0028055 A1 | 1/2019 | Yang et al. |
| 2019/0260328 A1 | 8/2019 | Nguyen et al. |
| 2019/0393361 A1 | 12/2019 | Lin et al. |
| 2020/0076352 A1 | 3/2020 | Nadimpally et al. |
| 2021/0091712 A1 | 3/2021 | Nguyen et al. |

FOREIGN PATENT DOCUMENTS

| | | |
|---|---|---|
| CN | 102956730 | 6/2016 |
| CN | 206401337 U | 8/2017 |
| CN | 206595269 U | 10/2017 |
| DE | 102007054124 | 5/2009 |
| EP | 0828036 A2 | 3/1998 |
| EP | 1058320 | 12/2000 |
| EP | 1362967 A1 | 11/2003 |
| EP | 1485547 A1 | 12/2004 |
| EP | 2051124 A2 | 4/2009 |
| EP | 2243901 A2 | 10/2010 |
| EP | 2362429 A2 | 8/2011 |
| EP | 2709160 | 3/2014 |
| EP | 2784241 A1 | 10/2014 |
| EP | 2950018 A1 | 12/2015 |
| GB | 2278618 | 12/1994 |
| GB | 2497276 A | 6/2013 |
| JP | S57141979 | 9/1982 |
| JP | S6020586 | 2/1985 |
| JP | H06140657 | 5/1994 |
| JP | H06264571 | 9/1994 |
| JP | 10-46769 A | 2/1998 |
| JP | 2000-58894 A | 2/2000 |
| JP | 2000091610 | 3/2000 |
| JP | 2000216415 | 8/2000 |
| JP | 2001-12038 A | 1/2001 |
| JP | 2001-15788 A | 1/2001 |
| JP | 2006-144267 A | 6/2006 |
| JP | 2013211385 | 10/2013 |
| JP | 2014-22702 A | 2/2014 |
| JP | 2017-517145 A | 6/2017 |
| KR | 100276185 B1 | 12/2000 |
| KR | 10-1162675 B1 | 7/2012 |
| WO | 2003/074812 A1 | 9/2003 |
| WO | 2008136872 | 11/2008 |
| WO | 2009062106 | 5/2009 |
| WO | 2009099418 | 8/2009 |
| WO | 2009/137347 A2 | 11/2009 |
| WO | 2010128375 | 11/2010 |
| WO | 2011128757 | 10/2011 |
| WO | 2013/059441 A1 | 4/2013 |
| WO | 201359441 | 4/2013 |
| WO | 2013067541 | 5/2013 |
| WO | 2013102181 | 7/2013 |
| WO | 2014178180 | 11/2014 |
| WO | 2015155356 | 10/2015 |
| WO | 2016/024310 A1 | 2/2016 |
| WO | 2016090341 | 6/2016 |

OTHER PUBLICATIONS

"An inorganic/organic hybrid coating for low cost metal mounted dye-sensitized solar cells" Vyas, N. et al.

"Recovery Act: Organic Coatings as Encapsulants for Low Cost, High Performance PV Modules" Jim Poole et al. Nov. 16, 2011.

Pelisset: "Efficiency of Silicon Thin-Film photovoltaic Modules with a Front Coloured Glass", Preceedings CISBAT 2011, Jan. 1, 2011, pp. 37-42, XP055049695, the Whole Document.

Bulucani et al., "A new approach: low cost masking material and efficient copper metallization for higher efficiency silicon solar cells" 2015 IEEE.

Advisory Action received for U.S. Appl. No. 15/686,109, dated Jun. 16, 2020, 3 pages.

Final Office Action received for U.S. Appl. No. 15/909,181, dated Dec. 20, 2018, 23 pages.

Final Office Action received for U.S. Appl. No. 15/656,794, dated Jul. 29, 2019, 19 pages.

Final Office Action received for U.S. Appl. No. 15/686,109, dated Dec. 12, 2019, 10 pages.

Final Office Action received for U.S. Appl. No. 15/686,064, dated Jul. 28, 2020, 13 pages.

International Preliminary Report on Patentability received for PCT Patent Application No. PCT/US2018/020508, dated Sep. 10, 2020, 10 pages.

International Preliminary Report on Patentability received for PCT Patent Application No. PCT/US2018/035918, dated Dec. 19, 2019, 11 pages.

International Preliminary Report on Patentability received for PCT Patent Application No. PCT/US2018/035924, dated Dec. 19, 2019, 8 pages.

International Preliminary Report on Patentability received for PCT Patent Application No. PCT/US2018/042418, dated Jan. 30, 2020, 12 pages.

International Search Report and Written Opinion received for PCT Patent Application No. PCT/US2018/035918, dated Nov. 6, 2018, 15 pages.

International Search Report and Written Opinion received for PCT Patent Application No. PCT/US2018/020508, dated Mar. 4, 2019, 14 pages.

(56) References Cited

OTHER PUBLICATIONS

International Search Report and Written Opinion received for PCT Patent Application No. PCT/US2018/035924, dated Sep. 12, 2018, 10 pages.
International Search Report and Written Opinion received for PCT Patent Application No. PCT/US2018/042418, dated Nov. 28, 2018, 14 pages.
International Search Report and Written Opinion received for PCT Patent Application No. PCT/US2019/044308, dated Oct. 14, 2019, 9 pages.
Invitation to Pay Additional Fee received for PCT Patent Application No. PCT/US2018/035918, dated Sep. 12, 2018, 11 pages.
Invitation to Pay Additional Fees received for PCT Patent Application No. PCT/US2018/020508, dated Jan. 9, 2019, 9 pages.
Non-Final Office Action received for U.S. Appl. No. 15/686,109, dated Nov. 25, 2020, 11 pages.
Non-Final Office Action received for U.S. Appl. No. 16/121,457, dated Jul. 28, 2020, 10 pages.
Non-Final Office Action received for U.S. Appl. No. 15/686,064, dated Nov. 29, 2019, 13 pages.
Non-Final Office Action received for U.S. Appl. No. 15/900,636, dated Jan. 28, 2020, 16 pages.
Notice of Allowance received for U.S. Appl. No. 15/656,794, dated Mar. 27, 2020, 10 pages.
Notice of Allowance received for U.S. Appl. No. 15/686,064, dated Dec. 30, 2020, 8 pages.
Notice of Allowance received for U.S. Appl. No. 15/900,636, dated Aug. 6, 2020, 10 pages.
Notice of Allowance received for U.S. Appl. No. 15/909,181, dated Sep. 10, 2019, 11 pages.
Office Action received for Australian Patent Application No. 2018410566, dated Jul. 9, 2020, 9 pages.
Office Action received for European Patent Application No. 18711759.3, dated Sep. 24, 2020, 4 pages.
Pre-Interview First Office Action received for U.S. Appl. No. 15/656,794, dated Apr. 16, 2019, 5 pages.
Pre-Interview First Office Action received for U.S. Appl. No. 15/686,109, dated May 24, 2019, 10 pages.
Pre-Interview First Office Action received for U.S. Appl. No. 15/909,181, dated Sep. 18, 2018, 6 pages.
Advisory Action received for U.S. Appl. No. 16/121,457, dated Apr. 20, 2021, 6 pages.
Advisory Action received for U.S. Appl. No. 16/121,457, dated May 14, 2021, 4 pages.
Final Office Action received for U.S. Appl. No. 15/686,109, dated Jun. 18, 2021, 9 pages.
Final Office Action received for U.S. Appl. No. 16/121,457, dated Jan. 21, 2021, 12 pages.
Intention to Grant received for European Patent Application No. 18711759.3, dated Feb. 18, 2021, 7 pages.
International Preliminary Report on Patentability received for PCT Patent Application No. PCT/US2019/044308, dated Feb. 11, 2021, 7 pages.
Non-Final Office Action received for U.S. Appl. No. 16/121,457, dated May 18, 2021, 11 pages.
Notice of Acceptance received for Australian Patent Application No. 2018410566, dated Feb. 3, 2021, 3 pages.
Office Action received for Canadian Patent Application No. 3,066,407, dated Jan. 29, 2021, 3 pages.
Office Action received for Canadian Patent Application No. 3,066,410, dated Feb. 9, 2021, 4 pages.
Office Action received for Canadian Patent Application No. 3,066,410, dated May 6, 2021, 3 pages.
Office Action received for European Patent Application No. 18733485.9, dated Mar. 11, 2021, 5 pages.
Office Action received for European Patent Application No. 18733486.7, dated Mar. 12, 2021, 3 pages.
Office Action received for Indian Patent Application No. 201947052632, dated Mar. 31, 2021, 5 pages.
Office Action received for Korean Patent Application No. 10-2020-7000127, dated Mar. 22, 2021, 10 pages (4 pages of English Translation and 6 pages of Official copy).
Office Action received for Korean Patent Application No. 10-2020-7000130, dated Mar. 24, 2021, 10 pages (3 pages of English Translation and 7 pages of Official copy).
Decision to Grant received for European Patent Application No. 18711759.3, dated Jul. 1, 2021, 2 pages.
Notice of Allowance received for U.S. Appl. No. 15/686,109, dated Sep. 29, 2021, 8 pages.
Office Action received for Canadian Patent Application No. 3055609, dated Aug. 18, 2021, 5 pages.
Office Action received for Japanese Patent Application No. 2019-547652, dated Aug. 18, 2021, 10 pages (4 pages of English Translation and 6 pages of Official copy).

\* cited by examiner

SOLAR ROOF TILE SPACER WITH EMBEDDED CIRCUITRY

BACKGROUND

Field

This disclosure is generally related to photovoltaic (or "PV") roof tile modules. More specifically, this disclosure is related to spacers used for mechanically and electrically coupling adjacent PV roof tiles within a multi-tile module.

Related Art

In residential and commercial solar energy installations, a building's roof typically is installed with photovoltaic (PV) modules, also called PV or solar panels, that can include a two-dimensional array (e.g., 6×12) of solar cells. A PV roof tile (or solar roof tile) can be a particular type of PV module offering weather protection for the home and a pleasing aesthetic appearance, while also functioning as a PV module to convert solar energy to electricity. The PV roof tile can be shaped like a conventional roof tile and can include one or more solar cells encapsulated between a front cover and a back cover, but typically encloses fewer solar cells than a conventional solar panel.

The front and back covers can be fortified glass or other material that can protect the PV cells from the weather elements. Note that a typical roof tile may have a dimension of 15 in×8 in =120 in$^2$=774 cm$^2$, and a typical solar cell may have a dimension of 6 in×6 in =36 in$^2$=232 cm$^2$. Similar to a conventional PV panel, the PV roof tile can include an encapsulating layer, such as an organic polymer. A lamination process can seal the solar cells between the front and back covers. Like conventional PV panels, electrical interconnections among different solar roof tiles are needed.

SUMMARY

One embodiment can provide a photovoltaic roof tile module. The photovoltaic roof tile module can include a first photovoltaic roof tile and a second photovoltaic roof tile positioned adjacent to each other and a spacer coupled to and positioned between the first and second photovoltaic roof tiles. A respective photovoltaic roof tile can include a front glass cover and a back cover, which includes a glass substrate and a pre-laid circuit attached to the glass substrate. The pre-laid circuit is electrically coupled to the plurality of photovoltaic structures. The spacer can include a thermal plastic body and one or more metallic strips embedded within the thermal plastic body, and both ends of a respective metallic strip extend beyond edges of the thermal plastic body to facilitate electrical coupling between pre-laid circuits of the first and second photovoltaic roof tiles.

In a variation on this embodiment, a respective photovoltaic structure can include a first edge busbar positioned near an edge of a first surface and a second edge busbar positioned near an opposite edge of a second surface, and the plurality of photovoltaic structures can be arranged in such a way that the first edge busbar of a first photovoltaic structure overlaps the second edge busbar of an adjacent photovoltaic structure, thereby resulting in the plurality of photovoltaic structures forming a cascaded string with the plurality of photovoltaic structures coupled to each other in series.

In a further variation, positive and negative polarities of the cascaded string are respectively coupled to first and second metallic strips embedded within the thermal plastic body.

In a variation on this embodiment, the thermal plastic body can include polyvinylidene fluoride (PVDF) or polytetrafluoroethylene (PTFE).

In a variation on this embodiment, the thermal plastic body can be formed using a plastic molding technique.

In a variation on this embodiment, the thermal plastic body can include a base and two wings extending from the base in opposite directions. A respective wing of the spacer can be positioned between the front and back covers of a respective photovoltaic roof tile, and the ends of the metallic strips can extend beyond the edges of the wings.

In a further variation, the base of the spacer can include a groove extending along a longitudinal axis on its sun-facing surface, thereby creating a visual effect of a gap between the first and second photovoltaic roof tiles.

In a variation on this embodiment, the pre-laid circuit can include metallic strips attached to the glass substrate via conductive paste or metallic traces printed onto the glass substrate.

In a variation on this embodiment, a respective metallic strip can include Cu.

One embodiment can provide a method for fabricating a photovoltaic roof module. The method can include preparing first and second back covers, with a respective back cover including a glass substrate and a pre-laid circuit attached to the glass substrate. The method can include preparing first and second sets of photovoltaic structures and placing the first and second sets of photovoltaic structures on the first and second back covers, respectively. Placing a respective set of photovoltaic structures can include electrically coupling the respective set of photovoltaic structures to a corresponding pre-laid circuit. The method can include forming a tile spacer that includes a thermal plastic body and one or more metallic strips embedded within the thermal plastic body. Both ends of a respective metallic strip can extend beyond edges of the thermal plastic body. The method can include placing the tile spacer between the first and second back covers. Placing the tile spacer can include electrically coupling the one or more metallic strips to pre-laid circuits on the first and second back covers. The method can further include placing an encapsulant layer above the first and second sets of photovoltaic structures, placing first and second front covers over the encapsulant layer, and performing a lamination operation. The first and second front covers can be positioned above the first and second back covers, respectively.

One embodiment can provide a reinforcement spacer for providing bonding and structural support to adjacent photovoltaic roof tiles within a photovoltaic roof tile module. The reinforcement spacer can include a thermal plastic body and one or more metallic strips embedded within the thermal plastic body, with both ends of a respective metallic strip extending beyond edges of the thermal plastic body.

A "solar cell" or "cell" is a photovoltaic structure capable of converting light into electricity. A cell may have any size and any shape, and may be created from a variety of materials. For example, a solar cell may be a photovoltaic structure fabricated on a silicon wafer or one or more thin films on a substrate material (e.g., glass, plastic, or any other material capable of supporting the photovoltaic structure), or a combination thereof.

A "solar cell strip," "photovoltaic strip," "smaller cell," or "strip" is a portion or segment of a photovoltaic structure, such as a solar cell. A photovoltaic structure may be divided into a number of strips. A strip may have any shape and any size. The width and length of a strip may be the same or different from each other. Strips may be formed by further dividing a previously divided strip.

A "cascade" is a physical arrangement of solar cells or strips that are electrically coupled via electrodes on or near their edges. There are many ways to physically connect adjacent photovoltaic structures. One way is to physically overlap them at or near the edges (e.g., one edge on the positive side and another edge on the negative side) of adjacent structures. This overlapping process is sometimes referred to as "shingling." Two or more cascading photovoltaic structures or strips can be referred to as a "cascaded string," or more simply as a "string."

"Finger lines," "finger electrodes," and "fingers" refer to elongated, electrically conductive (e.g., metallic) electrodes of a photovoltaic structure for collecting carriers.

"Busbar," "bus line," or "bus electrode" refer to elongated, electrically conductive (e.g., metallic) electrodes of a photovoltaic structure for aggregating current collected by two or more finger lines. A busbar is usually wider than a finger line, and can be deposited or otherwise positioned anywhere on or within the photovoltaic structure. A single photovoltaic structure may have one or more busbars.

A "photovoltaic structure" can refer to a solar cell, a segment, or a solar cell strip. A photovoltaic structure is not limited to a device fabricated by a particular method. For example, a photovoltaic structure can be a crystalline silicon-based solar cell, a thin film solar cell, an amorphous silicon-based solar cell, a polycrystalline silicon-based solar cell, or a strip thereof.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the disclosed system is not limited to the embodiments shown, but is to be accorded the widest scope consistent with the principles and features disclosed herein.

Overview

Embodiments of the invention solve at least the technical problem of enabling low-cost and reliable electrical interconnections among solar roof tiles within a multi-tile module. More specifically, embedded circuits can be used to electrically connect the multiple tiles within a multi-tile module. In some embodiments, an embedded circuit can include metallic strips or traces that are pre-laid onto the interior surface of the back cover of the multi-tile module. To facilitate inter-tile electrical coupling, a specially designed tile spacer that includes at least a section of the embedded circuit can be inserted between two neighboring solar roof tiles. More specifically, a circuit section (e.g., a piece of metallic strip) can be embedded inside the bottom layer of the tile spacer with both ends of the circuit section extruding out of the tile spacer. The extruded ends can be coupled to pre-laid circuit on the back covers, thus facilitating electrical coupling between adjacent tiles.

PV Roof Tiles and Multi-Tile Modules

A PV roof tile (or solar roof tile) is a type of PV module shaped like a roof tile and typically enclosing fewer solar cells than a conventional solar panel. Note that such PV roof tiles can function as both PV cells and roof tiles at the same time. PV roof tiles and modules are described in more detail in U.S. Provisional Patent Application No. 62/465,694, entitled "SYSTEM AND METHOD FOR PACKAGING PHOTOVOLTAIC ROOF TILES" filed Mar. 1, 2017, which is incorporated herein by reference. In some embodiments, the system disclosed herein can be applied to PV roof tiles and/or other types of PV module.

Figure 1:
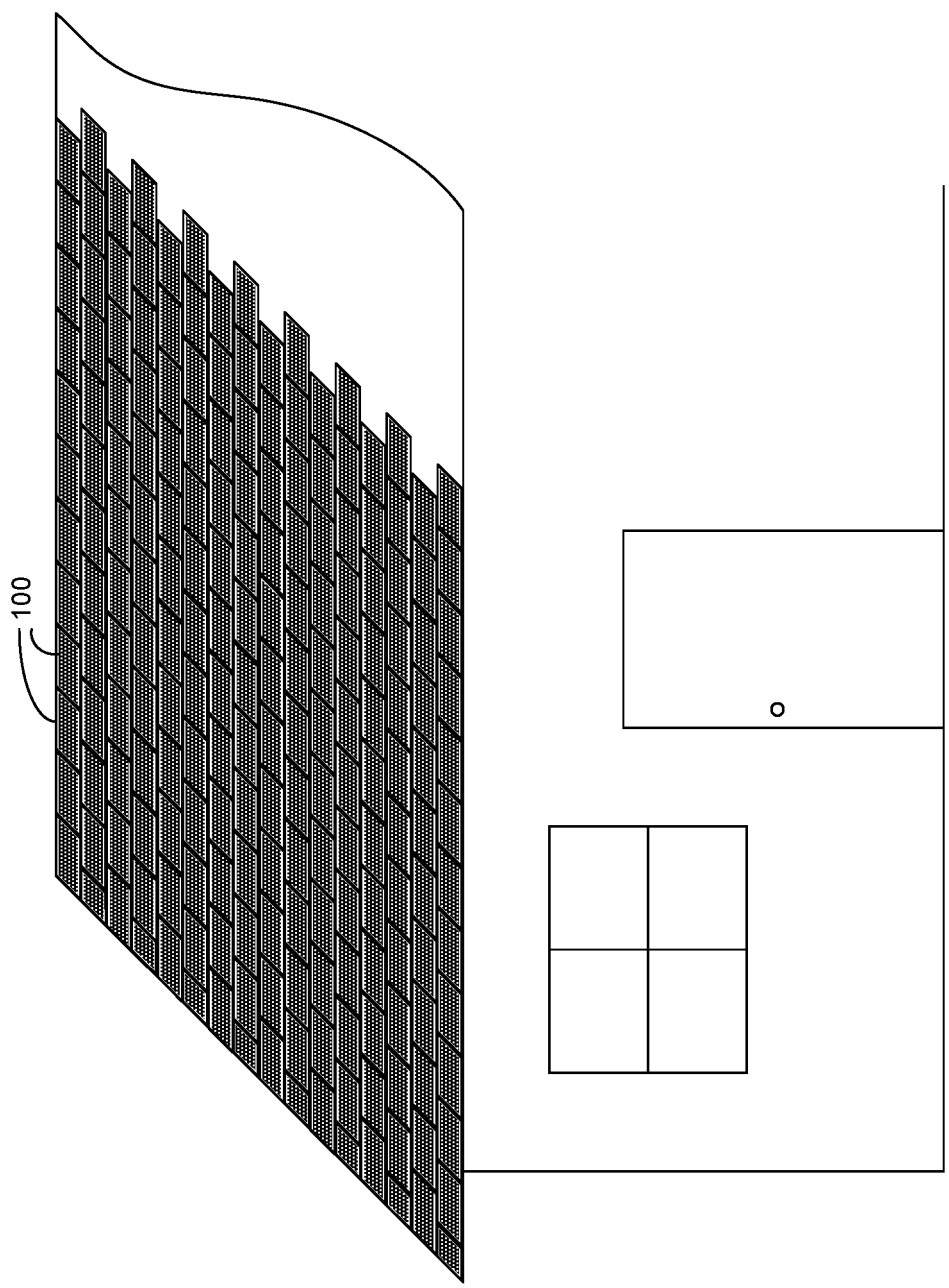
FIG. 1 shows an exemplary configuration of PV roof tiles on a house.

FIG. 1 shows an exemplary configuration of PV roof tiles on a house. PV roof tiles 100 can be installed on a house like conventional roof tiles or shingles. Particularly, a PV roof tile can be placed with other tiles in such a way as to prevent water from entering the building.

A PV roof tile can enclose multiple solar cells or PV structures, and a respective PV structure can include one or more electrodes, such as busbars and finger lines. The PV structures within a PV roof tile can be electrically and, optionally, mechanically coupled to each other. For example, multiple PV structures can be electrically coupled together by a metallic tab, via their respective busbars, to create serial or parallel connections. Moreover, electrical connections can be made between two adjacent tiles, so that a number of PV roof tiles can jointly provide electrical power.

Figure 2:
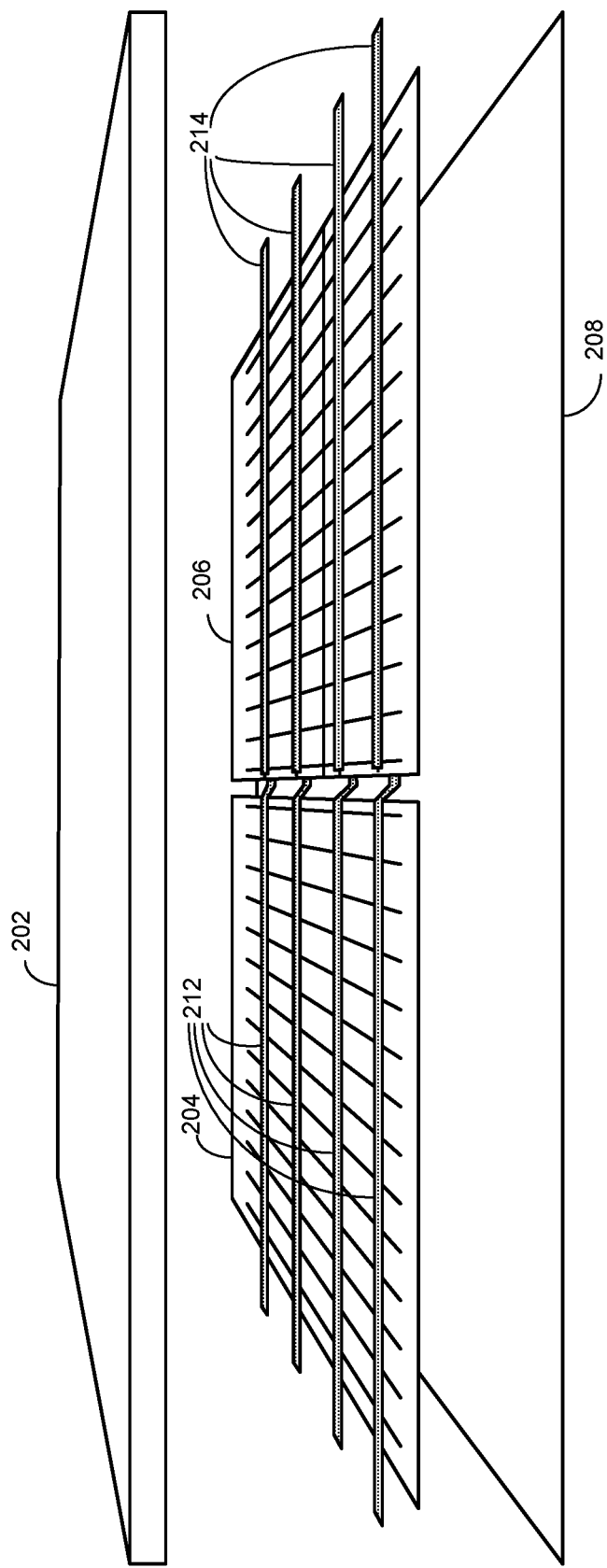
FIG. 2 shows the perspective view of an exemplary photovoltaic roof tile, according to an embodiment.

FIG. 2 shows the perspective view of an exemplary photovoltaic roof tile, according to an embodiment. Solar cells 204 and 206 can be hermetically sealed between top glass cover 202 and backsheet 208, which jointly can protect the solar cells from various weather elements. In the example shown in FIG. 2, metallic tabbing strips 212 can be in contact with the front-side electrodes of solar cell 204 and extend beyond the left edge of glass 202, thereby serving as contact electrodes of a first polarity of the PV roof tile. Tabbing strips 212 can also be in contact with the back of solar cell 206, creating a serial connection between solar cell 204 and solar cell 206. On the other hand, tabbing strips 214 can be in contact with front-side electrodes of solar cell 206 and extend beyond the right edge of glass cover 202, serving as contact electrodes of a second polarity of the PV roof tile.

Figure 3:
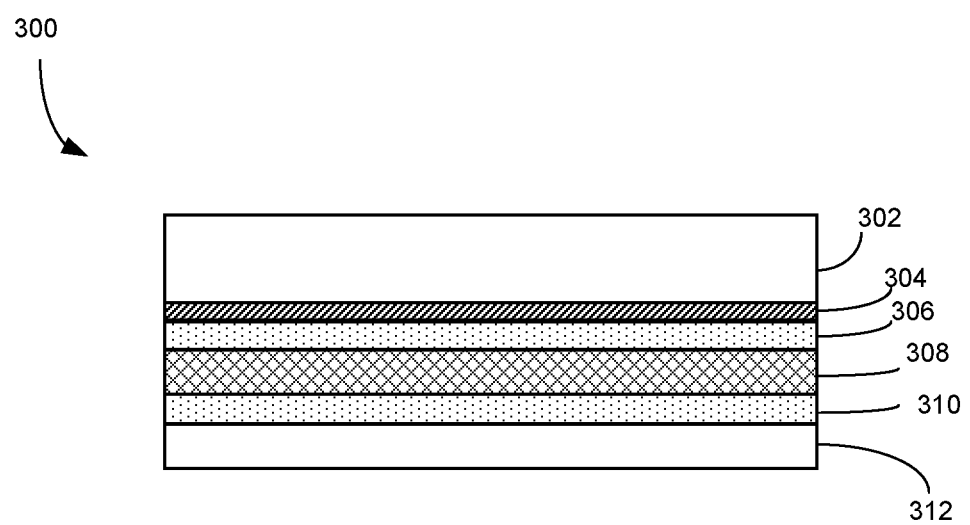
FIG. 3 shows a cross-section of an exemplary photovoltaic roof tile, according to an embodiment.

FIG. 3 shows a cross-section of an exemplary photovoltaic roof tile, according to an embodiment. Solar cell or array of solar cells 308 can be encapsulated between top glass cover 302 and back cover 312, which can be fortified glass or a regular PV backsheet. Top encapsulant layer 306, which can be based on a polymer, can be used to seal top glass cover 302 and solar cell or array of solar cells 308. Specifically, encapsulant layer 306 may include polyvinyl butyral (PVB), thermoplastic polyolefin (TPO), ethylene vinyl acetate (EVA), or N,N'-diphenyl-N,N'-bis(3-methylphenyl)-1,1'-diphenyl-4,4'-diamine (TPD). Similarly, lower encapsulant layer 310, which can be based on a similar material, can be used to seal array of solar cells 308 and back cover 312. A PV roof tile can also contain other optional layers, such as an optical filter or coating layer or a layer of nanoparticles for providing desired color appearances. In the example of FIG. 3, module or roof tile 300 also contains an optical filter layer 304.

Figure 4A:
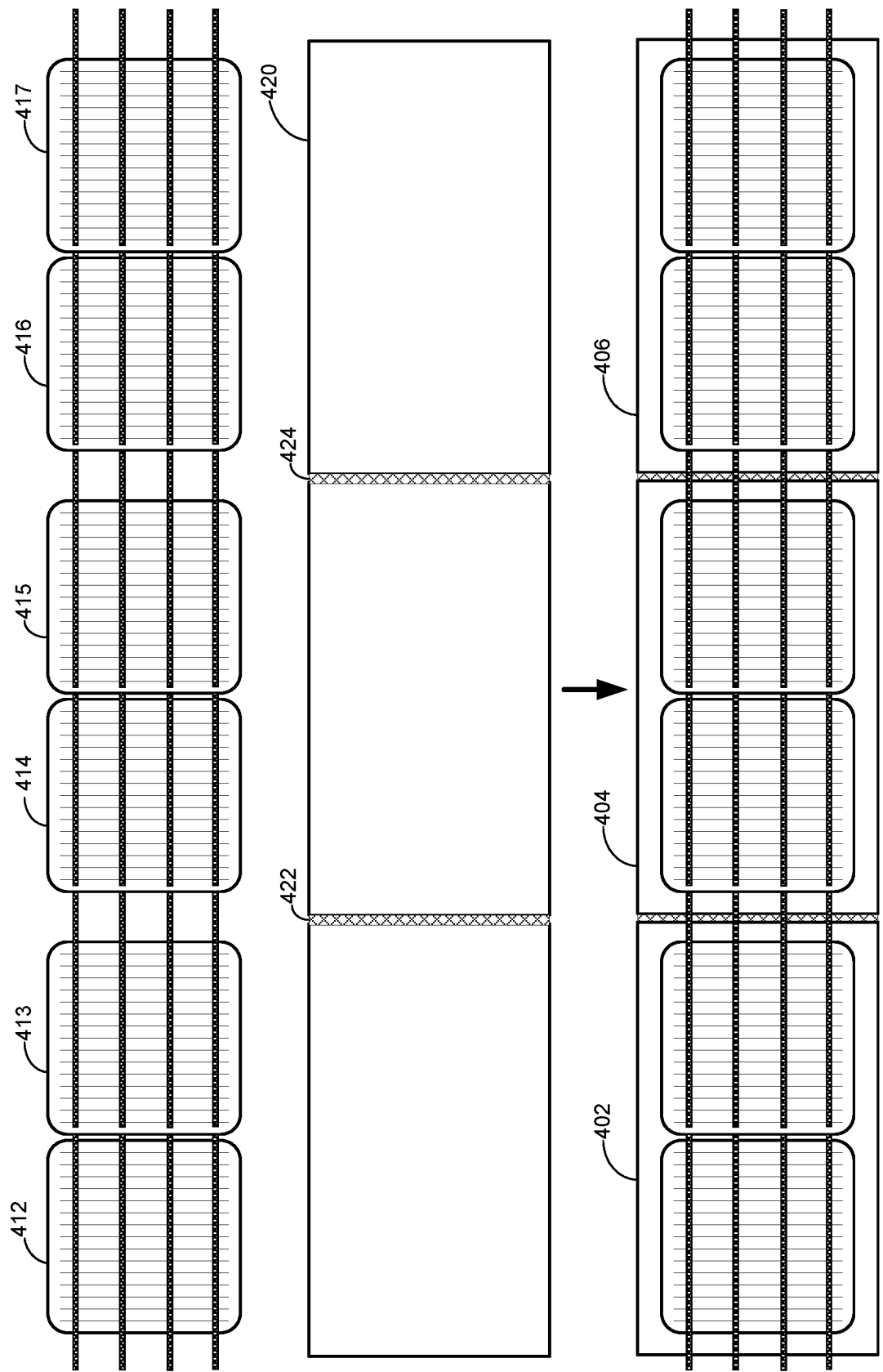
FIG. 4A illustrates an exemplary configuration of a multi-tile module, according to one embodiment.

To facilitate more scalable production and easier installation, multiple photovoltaic roof tiles can be fabricated together, while the tiles are linked in a rigid or semi-rigid way. FIG. 4A illustrates an exemplary configuration of a multi-tile module, according to one embodiment. In this example, three PV roof tiles 402, 404, and 406 can be manufactured together. During fabrication, solar cells 412 and 413 (corresponding to tile 402), 414 and 415 (corresponding to tile 404), and 416 and 417 (corresponding to tile 406) can be laid out with tabbing strips interconnecting their corresponding busbars, forming a connection in series. Furthermore, these six solar cells can be laid out on a common backsheet. Subsequently, front-side glass cover 420 can be sealed onto these six PV cells.

It is possible to use a single piece of glass as glass cover 420. In one embodiment, grooves 422 and 424 can be made on glass cover 420, so that the appearance of three separate roof tiles can be achieved. It is also possible to use three separate pieces of glass to cover the six cells, which are laid out on a common backsheet. In this case, gaps 422 and 424 can be sealed with an encapsulant material, establishing a semi-rigid coupling between adjacent tiles. Prefabricating multiple tiles into a rigid or semi-rigid multi-tile module can significantly reduce the complexity in roof installation, because the tiles within the module have been connected with the tabbing strips. Note that the number of tiles included in each multi-tile module can be more or fewer than what is shown in FIG. 4A.

Figure 4B:
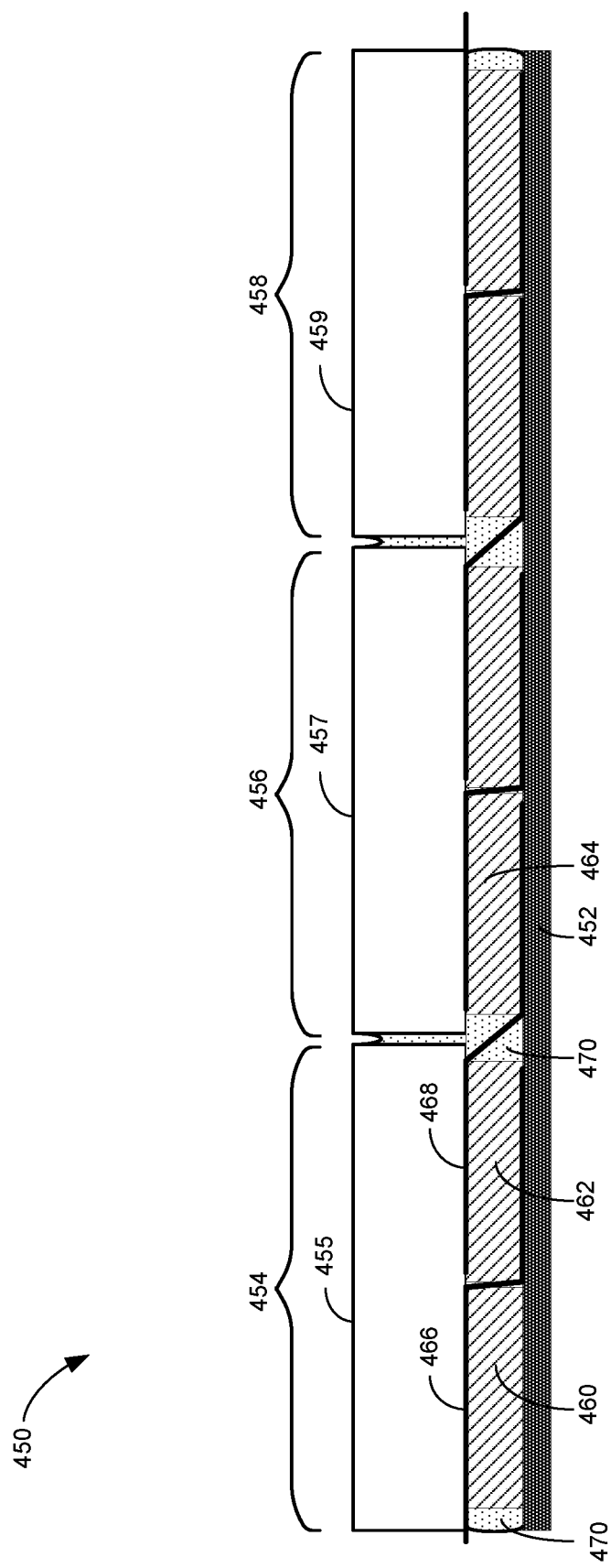
FIG. 4B illustrates a cross-section of an exemplary multi-tile module, according to one embodiment.

FIG. 4B illustrates a cross-section of an exemplary multi-tile module, according to one embodiment. In this example, multi-tile module 450 can include photovoltaic roof tiles 454, 456, and 458. These tiles can share common backsheet 452, and have three individual glass covers 455, 457, and 459, respectively. Each tile can encapsulate two solar cells. For example, tile 454 can include solar cells 460 and 462 encapsulated between backsheet 452 and glass cover 455. Tabbing strips can be used to provide electrical coupling within each tile and between adjacent tiles. For example, tabbing strip 466 can couple the front electrode of solar cell 460 to the back electrode of solar cell 462, creating a serial connection between these two cells. Similarly, tabbing strip 468 can couple the front electrode of cell 462 to the back electrode of cell 464, creating a serial connection between tile 454 and tile 456.

The gap between two adjacent PV tiles can be filled with encapsulant, protecting tabbing strips interconnecting the two adjacent tiles from the weather elements. For example, encapsulant 470 fills the gap between tiles 454 and 456, protecting tabbing strip 468 from weather elements. Furthermore, the three glass covers, backsheet 452, and the encapsulant together form a semi-rigid construction for multi-tile module 450. This semi-rigid construction can facilitate easier installation while providing a certain degree of flexibility among the tiles.

In addition to the examples shown in FIGS. 4A and 4B, a PV tile may include different forms of photovoltaic structures. For example, in order to reduce internal resistance, each square solar cell shown in FIG. 4A can be divided into multiple (e.g., three) smaller strips, each having edge busbars of different polarities on its two opposite edges. The edge busbars allow the strips to be cascaded one by one to form a serially connected string.

Figure 5A:
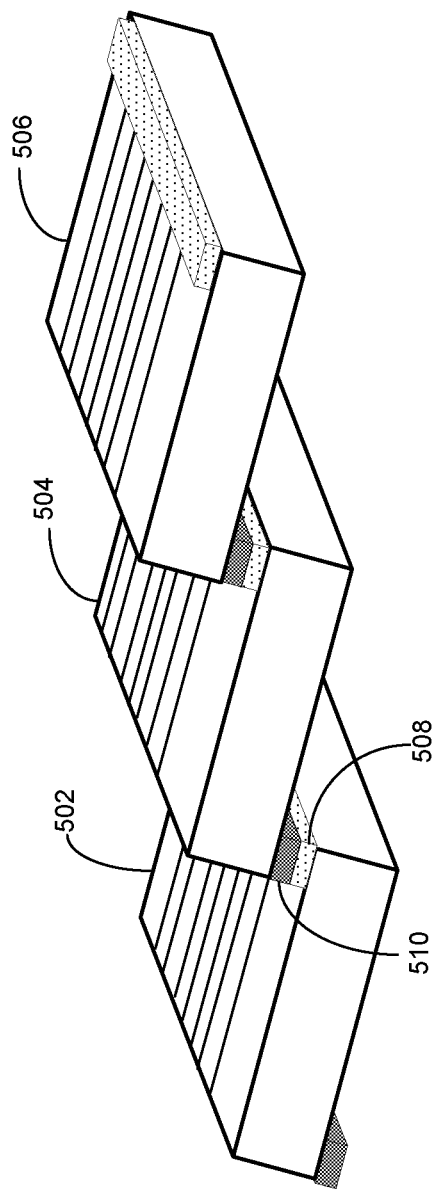
FIG. 5A illustrates a serial connection among three adjacent cascaded photovoltaic strips, according to one embodiment.

FIG. 5A illustrates a serial connection among three adjacent cascaded photovoltaic strips, according to one embodiment. In FIG. 5A, strips 502, 504, and 506 are stacked in such a way that strip 504 partially underlaps adjacent strip 506 to its right, and overlaps strip 502 to its left. The resulting string of strips forms a cascaded pattern similar to roof shingles. Strips 502 and 504 are electrically coupled in series via edge busbar 508 at the top surface of strip 502 and edge busbar 510 at the bottom surface of strip 504. Strips 502 and 504 can be arranged in such a way that bottom edge busbar 510 is above and in direct contact with top edge busbar 508. The coupling between strips 504 and 506 can be similar.

Figure 5B:
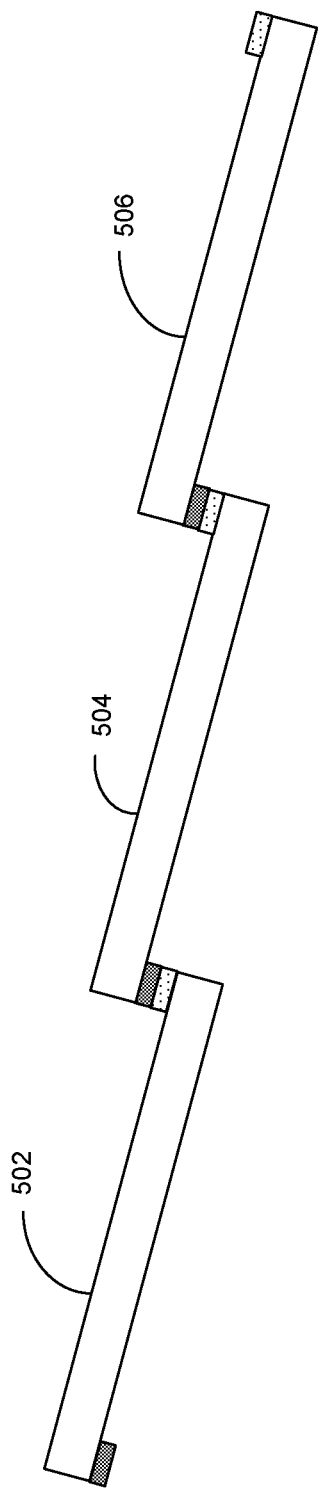
FIG. 5B illustrates the side view of the string of cascaded strips, according to one embodiment.

FIG. 5B illustrates the side view of the string of cascaded strips, according to one embodiment. In the example shown in FIGS. 5A and 5B, the strips can be segments of a six-inch square or pseudo-square solar cell, with each strip having a dimension of approximately two inches by six inches. To reduce shading, the overlapping between adjacent strips should be kept as small as possible. Therefore, in the example shown in FIGS. 5A and 5B, the single busbars (both at the top and the bottom surfaces) can be placed at or near the very edge of the strip. The same cascaded pattern can extend along multiple strips to form a serially connected string, and a number of strings can be coupled in series or parallel.

Figure 5C:
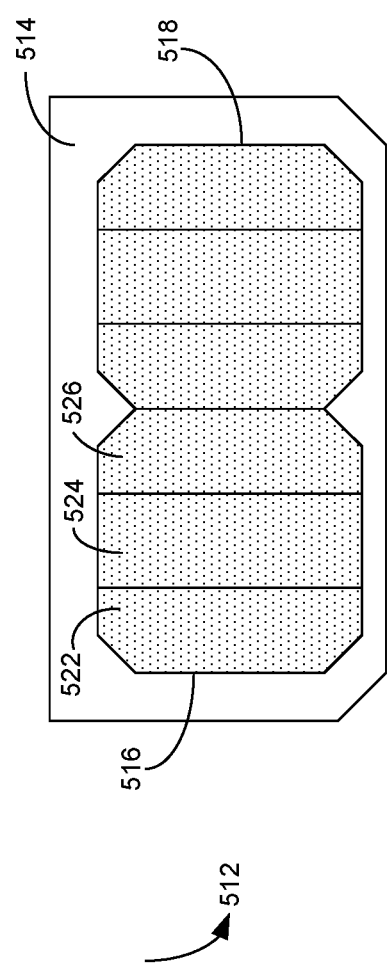
FIG. 5C illustrates an exemplary solar roof tile, according to one embodiment.

FIG. 5C illustrates an exemplary solar roof tile, according to one embodiment. A solar roof tile 512 includes top glass cover 514 and solar cells 516 and 518. The bottom cover (e.g., backsheet) of solar roof tile 512 is out of view in FIG. 5C. Solar cells 516 and 518 can be conventional square or pseudo-square solar cells, such as six-inch solar cells. In some embodiments, solar cells 516 and 518 can each be divided into three separate pieces of similar size. For example, solar cell 516 can include strips 522, 524, and 526. These strips can be arranged in such a way that adjacent strips are partially overlapped at the edges, similar to the ones shown in FIGS. 5A-5B. For simplicity of illustration, the electrode grids, including the finger lines and edge busbars, of the strips are not shown in FIG. 5C. In addition to the example shown in FIG. 5C, a solar roof tile can contain fewer or more cascaded strips, which can be of various shapes and size.

In some embodiments, multiple solar roof tiles, each encapsulating a cascaded string, can be assembled to obtain a multi-tile module. Inner-tile electrical coupling has been accomplished by overlapping corresponding edge busbars of adjacent strips. However, inter-tile electrical coupling within such a multi-tile module can be a challenge. Strain-relief connectors and long bussing strips have been used to facilitate inter-tile coupling. Moreover, a specially designed tile spacer can be inserted between adjacent solar roof tiles, mechanically coupling the adjacent roof tiles. In order to appear similar to a conventional roof that includes individual roof tiles, the sun-facing surface of a tile spacer can include a groove. In addition, to allow for the long bussing strips to thread through the tile spacers, each tile spacer needs to include, on its back side, an indentation or channel. To accommodate the channel on the back side, the groove on the front side of the tile spacer typically does not run through the entire length of the spacer.

Strain-relief connectors can be expensive, and arranging bussing strips after the arrangement of the cascaded strings and tile spacers can be cumbersome. Therefore, it is desirable to implement an embedded circuit, which can be similar to metal traces on a printed circuit board (PCB), for inter-tile electrical coupling. In some embodiments, an embedded circuit can include metallic strips or traces that have been pre-laid onto the back covers of photovoltaic tiles within the multi-tile module.

Figure 6:
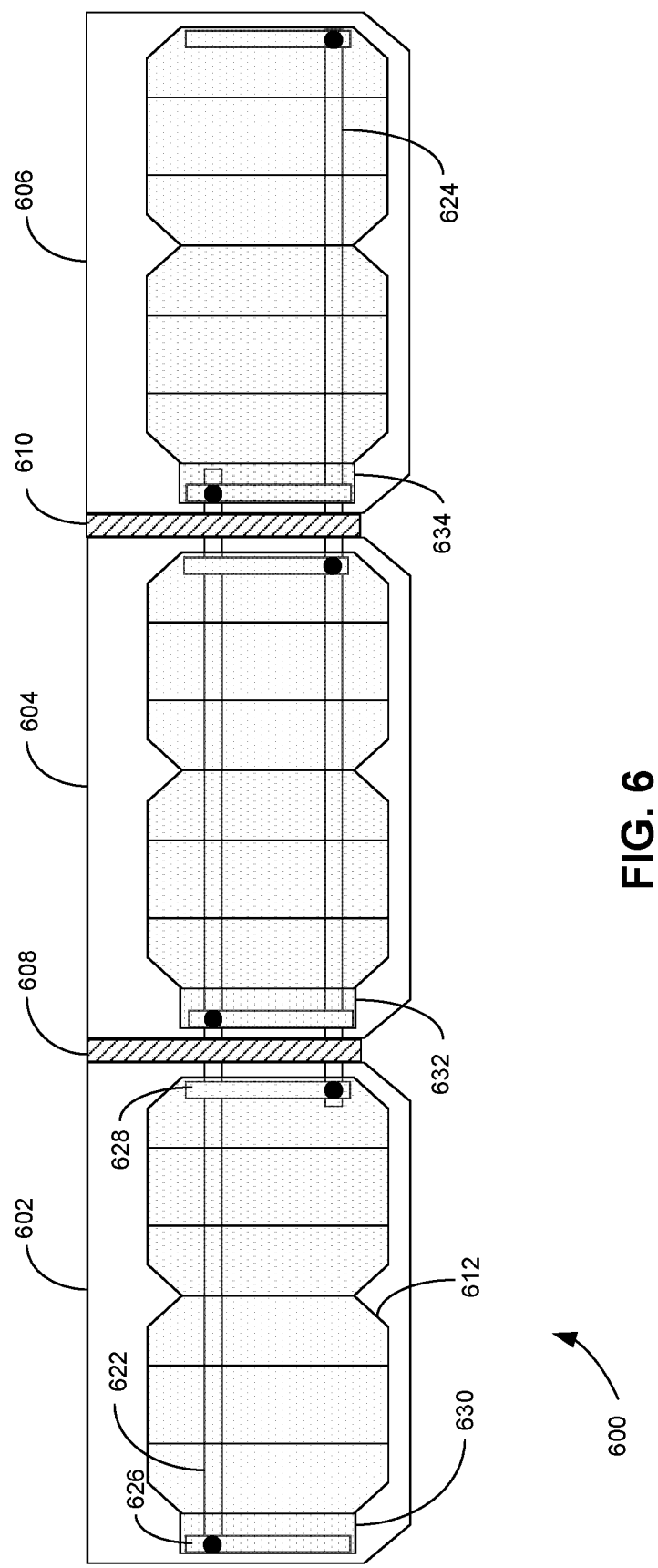
FIG. 6 illustrates an exemplary fabricated multi-tile module with an embedded circuit, according to one embodiment.

FIG. 6 illustrates an exemplary fabricated multi-tile module with an embedded circuit, according to one embodiment. Multi-tile module 600 can include a number of tiles (e.g., tiles 602, 604, and 606) that are placed adjacent to each other in the lateral direction, with neighboring tiles being mechanically coupled to each other via a tile spacer. For example, tile spacer 608 mechanically couples tiles 602 and 604, and tile spacer 610 mechanically couples tiles 604 and 606. Each tile can include a cascaded string of photovoltaic structures encapsulated between front and back covers. For example, tile 602 can include cascaded string 612. Note that the photovoltaic structures within each cascaded string are also arranged to be adjacent to one another in the lateral direction.

In some embodiments, each tile can also include a Si-based bridge electrode (e.g., bridge electrodes 630, 632, and 634) attached to an edge of the cascaded string. More specifically, the Si-based bridge electrode can include a metallic layer covering its entire back surface and, optionally, a back edge busbar. By overlapping its edge (e.g., back edge busbar) to the front edge busbar of the cascaded string, the Si-based bridge electrode can turn itself into an electrode for the cascaded string, converting the forward-facing electrode of the cascaded string into an electrode accessible from the back side of the cascaded string. Detailed descriptions of the Si-based bridge electrode can be found in U.S. patent application Ser. No. 16/006,645, filed Jun. 12, 2018, and entitled "SOLAR ROOF TILE CONNECTORS," the disclosure of which is incorporated herein by reference in its entirety. In alternative embodiments, bridge electrodes 630, 632, and 634 can include simple metal tabs coupled to the front edge busbar of each cascaded string.

Each tile cover can include a front tile cover and a front encapsulant layer, which are transparent and are not labeled in FIG. 6. For illustration purposes, the cascaded strings (e.g., cascaded string 612) can be shown as semi-transparent to reveal the pre-laid circuit on the back covers of the tiles. The pre-laid circuit can include a number of metallic strips or traces that have been directly deposited onto the interior surface of the back covers. In the example shown in FIG. 6, the pre-laid circuit includes two cross-tile metallic strips (e.g., metallic strips 622 and 624) that run across multiple tiles in the lateral direction. The pre-laid circuit can also include a number of metallic strips or traces that run in the vertical direction (e.g., metallic strips 626 and 628). These vertical metallic strips or traces underlap the bottom edge busbar of the cascaded strings and the contact pads of the bridge electrodes (e.g., bridge electrodes 630, 632, and 634). For example, vertical metallic strip 626 underlaps contact pads of bridge electrode 630, and vertical metallic strip 628 underlaps the bottom edge busbar of cascaded string 612.

In the example shown in FIG. 6, the pre-laid circuit facilitates in-parallel electrical connections among the cascaded strings. In practice, the pre-laid circuit can be configured differently, depending on the need. For example, the coupling between the lateral cross-tile metallic strips and the vertical metallic strips can be configured in such a way that they facilitate in-series electrical connections among the cascaded strings. Alternatively, a combination of in-parallel and in-series electrical connections can also be achieved within a same multi-tile module. Detailed descriptions of the pre-laid circuit can be found in U.S. patent application Ser. No. 16/023,480, filed Jun. 29, 2018, and entitled "SOLAR ROOF TILE MODULE WITH EMBEDDED INTER-TILE CIRCUITRY," the disclosure of which is incorporated herein by reference in its entirety.

As one can see in FIG. 6, the pre-laid circuit can almost completely hide underneath the cascaded string, thus eliminating the need for color-matching between the pre-laid circuit and the cascaded strings. Moreover, pre-laying the inter-tile circuitry onto the back glass cover can provide a more streamlined fabrication process. However, the modified positions of the lateral cross-tile metallic strips also means that the tile spacers (e.g., a tile spacer having a groove on its front side and a channel on its back side) can no longer work for a multi-tile module with a pre-laid circuit on its back cover, because there is typically an offset between the back-side channel and cascaded strings in the vertical direction.

Tile Spacer with Embedded Circuitry

As discussed before, the pre-laid circuit is positioned directly underneath the cascaded strings, meaning that the metallic strips or traces of the pre-laid circuit need to run through the middle section of the back cover of the multi-tile module. Therefore, if a back-side channel is used to accommodate the pre-laid circuit, the channel needs to be positioned directly under the front-side groove. However, the thickness of the tile spacer is typically limited by the thickness of the tile (e.g., a few millimeters) and cannot accommodate such an arrangement. A new type of tile spacer is needed to accommodate the embedded, pre-laid circuit in the multi-tile module.

In some embodiments, a novel tile spacer can be provided to facilitate inter-tile electrical connections within the multi-tile module. More specifically, the unique design of the tile spacer allows for the inter-tile electrical connections to be made through the use of the pre-laid circuit (e.g., metallic strips or traces pre-laid onto the back cover of each tile of the multi-tile module. More specifically, the novel tile spacer can include an embedded circuit component (e.g., a conductive segment) that can be coupled with the pre-laid circuit on the back cover. The combined circuit, including the pre-laid circuits on the back covers and the circuit components embedded in the tile spacers, can form the multi-tile circuit for achieving inter-tile electrical connections.

Figure 7A:
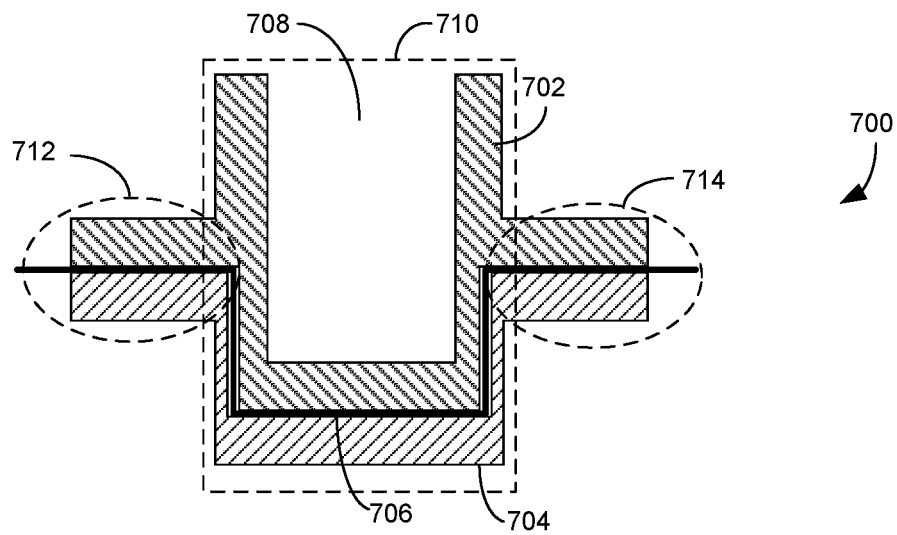
FIG. 7A shows the front view of a novel tile spacer, according to one embodiment.

FIG. 7A shows the front view of the novel tile spacer, according to one embodiment. Tile spacer 700 can include upper portion 702, lower portion 704, and embedded circuit component 706 sandwiched between upper portion 702 and lower portion 704. In some embodiments, embedded circuit component 706 can include metallic strips (e.g., Cu strips), and both ends of the metallic strip can extend out of tile spacer 700.

Upper and lower portions 702 and 704 of spacer 700 can be made of the same material or different materials. It is desirable to use materials that are insulating, mechanically strong, and capable of withstanding long-term sun exposure to fabricate the upper and lower portions of tile spacer 700. In some embodiments, upper and lower portions of spacer 700 can be made of a polymer or thermoplastic material, such as polyvinylidene fluoride (PVDF) and polytetrafluoroethylene (PTFE). In alternative embodiments, spacer 700 can be made of a soft material, such as silicone.

FIG. 7A also shows that tile spacer 700 can include a base 710 and wing sections 712 and 714 extending laterally on either side of base 710. Moreover, base 710 can include on its top surface a groove 708. As discussed previously, groove 708 can create the aesthetic effect of individual tiles arranged next to each other with a gap in between. This mimics the appearance of a conventional roof. The depth of groove 708 can be determined based on the total thickness of base 710. More specifically, groove 708 needs to be sufficiently deep in order to achieve the desired aesthetic effect while allowing for sufficient space to accommodate embedded circuit component 706. In some embodiments, the depth of groove 708 can be about half of the total thickness of base 710.

Figure 7B:
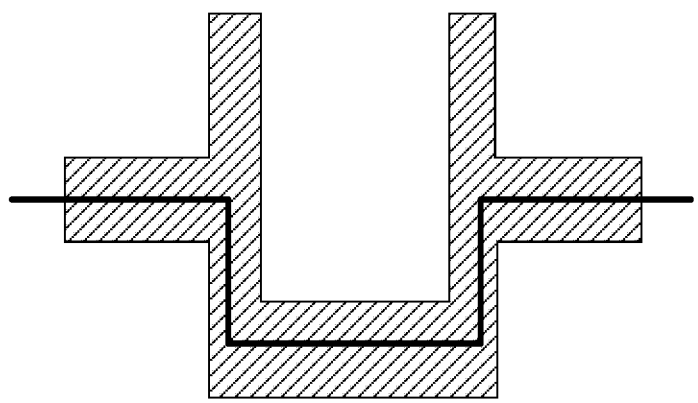
FIG. 7B shows the front view of a novel tile spacer, according to one embodiment.

In the example shown in FIG. 7A, the tile spacer can include two separate pieces that can be assembled to sandwich the embedded circuit component. In practice, it is also possible to form a tile spacer by molding the embedded circuit component inside a single piece of plastic, as shown in FIG. 7B. For example, when forming the tile spacer using a moldable plastic material (e.g., thermal plastic), one can place the embedded circuit component inside the mold at a desired location before injecting the molten plastic.

Figure 7D:
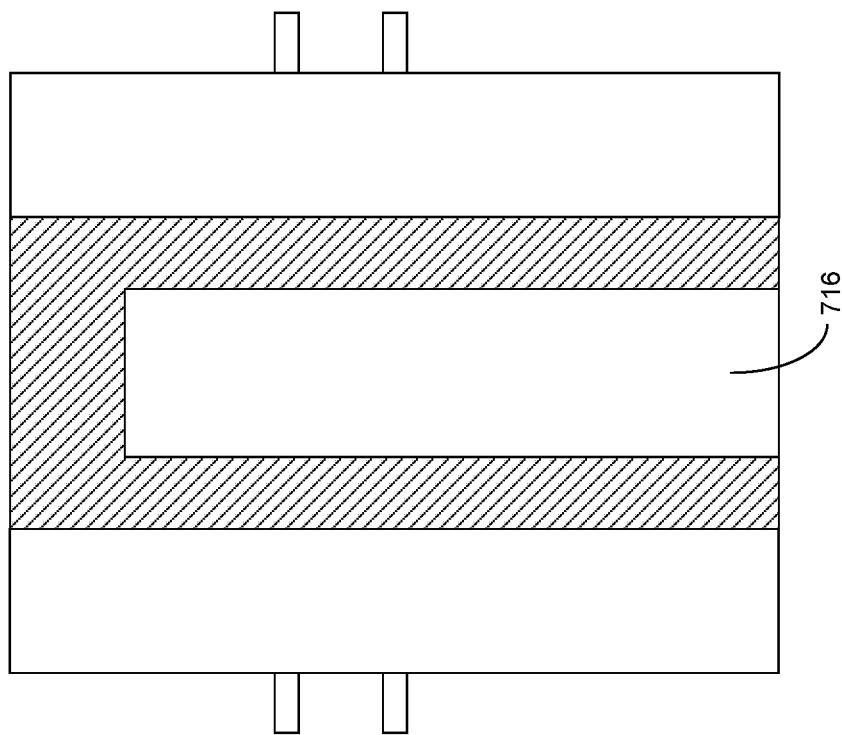
FIG. 7D shows the top view of an exemplary tile spacer with a partially extended groove, according to one embodiment.
Figure 7C:
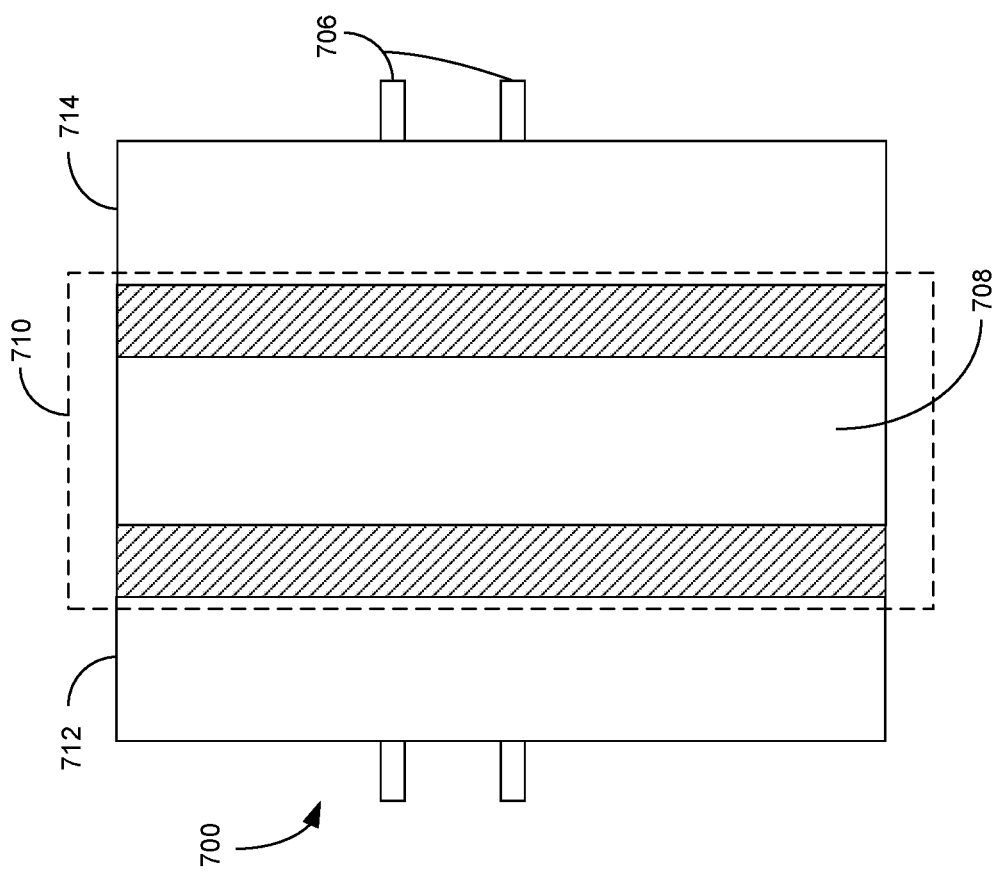
FIG. 7C shows the top view of an exemplary tile spacer, according to one embodiment.

FIG. 7C shows the top view of an exemplary tile spacer, according to one embodiment. As shown in FIG. 7C, tile spacer 700 can include a base 710 and wing sections 712 and 714 extending laterally on either side of base 710. Embedded circuit component 706 extends beyond edges of wing sections 712 and 714. In the example shown in FIG. 7C, embedded circuit component 706 can include two metallic strips, each for a particular polarity. As discussed previously, groove 708 can create the aesthetic effect of individual tiles arranged next to each other with a gap in between, mimicking the appearance of a conventional roof. Because tile spacer 700 no longer needs a back-side channel, groove 708 can extend across the entire top surface of tile spacer 700, from one edge to the opposite edge. However, it is also possible to have the groove extending partially on the top surface of tile spacer 700, as shown in FIG. 7D. FIG. 7D shows the top view of an exemplary tile spacer with a partially extended groove, according to one embodiment. In FIG. 7D, groove 716 extends partially across the top surface of the tile spacer. Such a partially extended groove will not change the appearance of the solar roof, as long as the surface portion not covered by groove 716 can be concealed by an overlaying tile from an adjacent row, as shown in FIG. 8.

Figure 8:
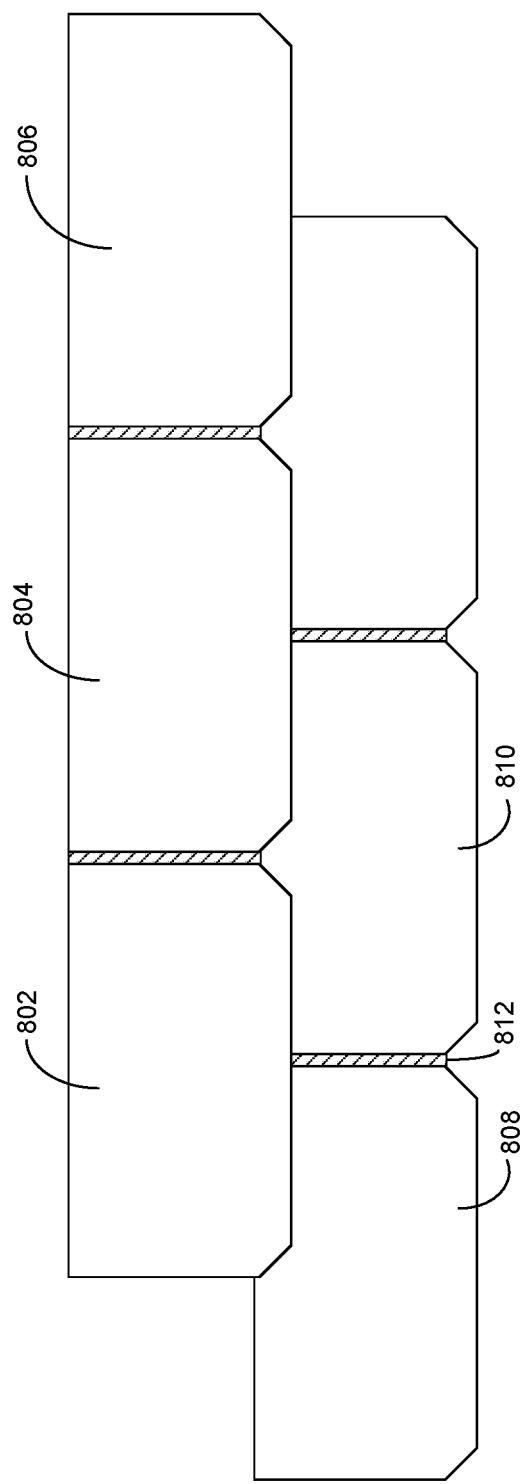
FIG. 8 illustrates multiple photovoltaic roof tiles installed in an overlapping configuration, according to an embodiment.

FIG. 8 illustrates multiple photovoltaic roof tiles installed in an overlapping configuration, according to an embodiment. In FIG. 8, a multi-tile module containing PV roof tiles 802, 804, and 806 can overlap with a multi-tile module positioned on a different row of the roof. The multi-tile modules are arranged in such a way that PV tiles (e.g., PV tiles 802 and 804) can overlap, at their lower edges, PV roof tiles (e.g., PV tiles 808 and 810) positioned on a different row in an offset manner such that the gap between adjacent tiles in one row somewhat align with the center of a PV roof tile located in another row. This arrangement can prevent possible water leakage through the grooves between adjacent PV tiles or gaps between adjacent tile modules. As one can see from FIG. 8, the upper edge of the tile spacers in the lower row (e.g., tile spacer 812) can be concealed by the tiles in the upper row. This means the grooves on the top surface of the spacers can only be seen partially.

Figure 9A:
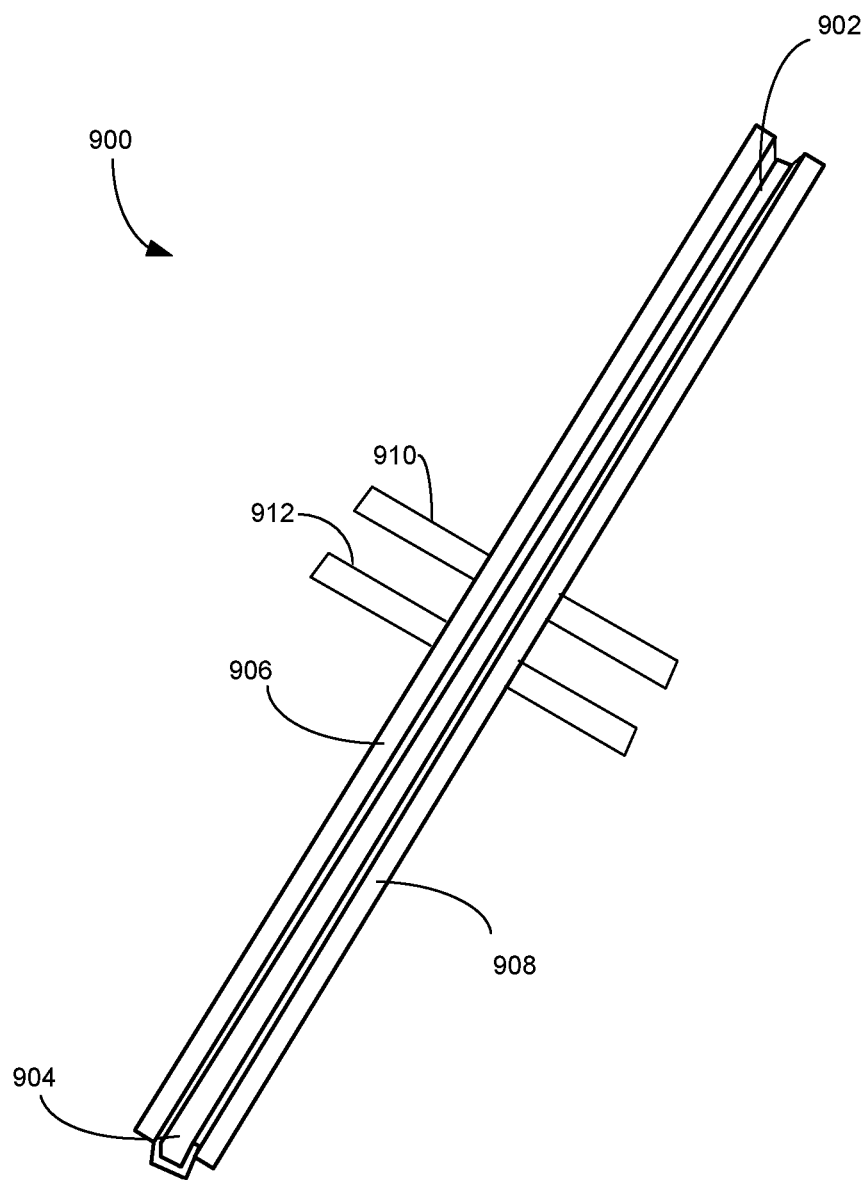
FIG. 9A shows a perspective view of an exemplary tile spacer, according to one embodiment.

FIG. 9A shows a perspective view of an exemplary tile spacer, according to one embodiment. In FIG. 9A, tile spacer 900 includes a main body (can be referred to as a base or base ridge) 902 that can be inserted between the adjacent PV roof tiles. When in position, base 902 can be arranged in such a way that its longitudinal axis is oriented parallel to the adjacent edges of the tiles. The thickness of base 902 can be designed in such a way that, when in position, the top or sun-facing surface of base 902 can be aligned with the surface of the top glass cover of the PV tiles, thus creating a seamless interface between base 902 and the PV tiles. Base 902 can include a groove 904 on its top surface. In the example shown in FIG. 9A, groove 904 extends through the entire longitudinal axis of base 902. Moreover, the cross-section of groove 904 can be U-shaped, with square corners. Alternatively, the cross-section of the groove can be U-shaped, with round corners. Groove 904 can also have other types of cross-section, such as a V-shaped cross-section or a trapezoidal cross-section.

Spacer 900 can have two wings 906 and 908 attached to either side of base 902. The position and thickness of each wing are designed in such a way that, when in position, the wings can be inserted into the adjacent roof tiles. More specifically, each wing can be inserted between the top glass cover and backsheet of a corresponding roof tile. Therefore, after lamination, each PV tile can be mechanically bound to a wing, thus creating a rigid or semi-rigid bonding between the two adjacent PV tiles.

In the example shown in FIG. 9A, the wings can be rectangular and extend perpendicularly from the walls of groove 904. Other shapes are possible. For example, the wings may have a tapered thickness. The length of the wings can vary. Longer wings can provide a stronger bond and a greater flexibility. In particular, longer wings provide greater adhesion to the glass and backsheet, and can allow the spacer to bend at a greater angle without detaching from the roof tiles. However, longer wings can occupy too much tile space and may shrink more upon cooling after lamination, leaving "bubbles" or space unfilled by the lamination. In some embodiments, the length of the wings can be chosen to provide enough flexibility for bending by an angle of up to 5° or 10°. For example, the length of the wings can be at least 3 mm (e.g., between 3 and 5 mm). In some embodiments, the length of the wings can be between 10 mm and 20 mm. A spacer with 20 mm wings can allow adjacent PV roof tiles to be offset from each other by 90°. The thickness of the wings can also vary, as long as sufficient structure strength of spacer 900 can be achieved, while allowing a sufficient amount of encapsulant to flow between the wings and the front and back covers of the PV tiles.

Spacer 900 can also include metallic strips 910 and 912 embedded inside the body of base 902 and wings 906 and 908. More specifically, metallic strips 910 and 912 extend beyond the edges of wings 906 and 908, making it possible for metallic strips 910 and 912 to come into contact with pre-laid circuit components on the back covers of the solar roof tiles.

Figure 9B:
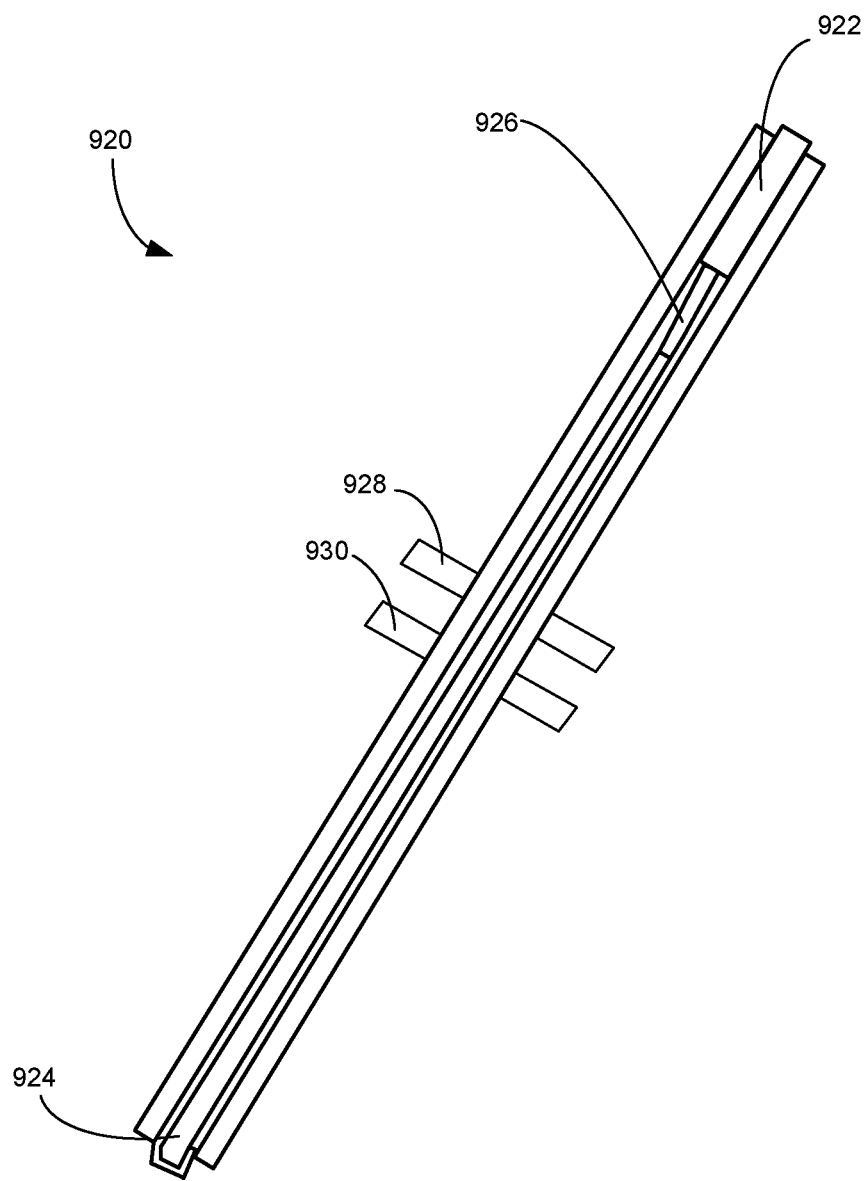
FIG. 9B shows a perspective view of an exemplary tile spacer, according to one embodiment.
Figure 9C:
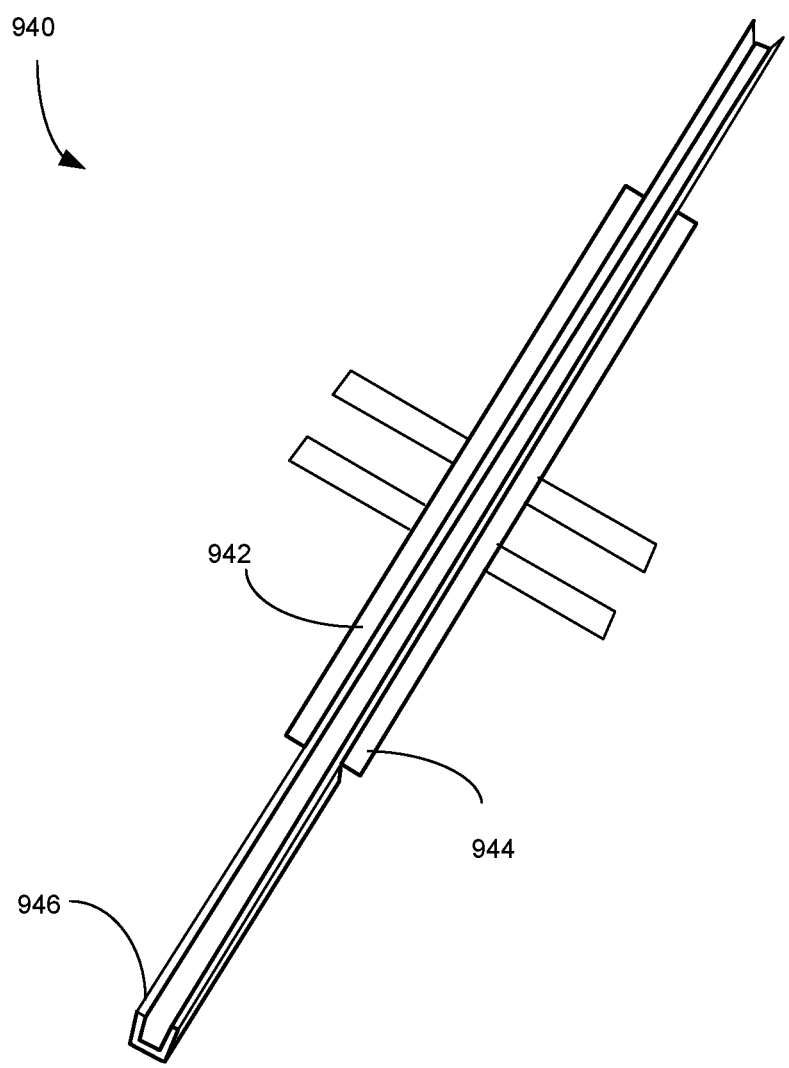
FIG. 9C shows a perspective view of an exemplary tile spacer, according to one embodiment.

FIG. 9B shows a perspective view of an exemplary tile spacer, according to one embodiment. In the example shown in FIG. 9B, base 922 of tile spacer 920 includes a groove 924 that extends partially along the longitudinal axis of base 922. More specifically, a ramp 926 can be formed between the top surface of base 922 and the bottom surface of groove 924. Such a ramp can prevent rainwater from getting under the tiles of the upper row in windy conditions. Tile spacer 920 also includes metallic strips 928 and 930 that extend beyond the edges of wings 906 and 908. The extended portions of metallic strips 928 and 930 can be shorter than those of metallic strips 910 and 912. Note that the lengths of those extended portions do not limit the scope of the instant application, as long as they are sufficiently long to allow for electrical coupling between those metallic strips and the pre-laid circuit on the back covers of the solar roof tiles. FIG. 9C shows a perspective view of an exemplary tile spacer, according to one embodiment. In FIG. 9C, wings 942 and 944 of tile spacer 940 partially extend along the longitudinal axis of base 946.

Figure 10:
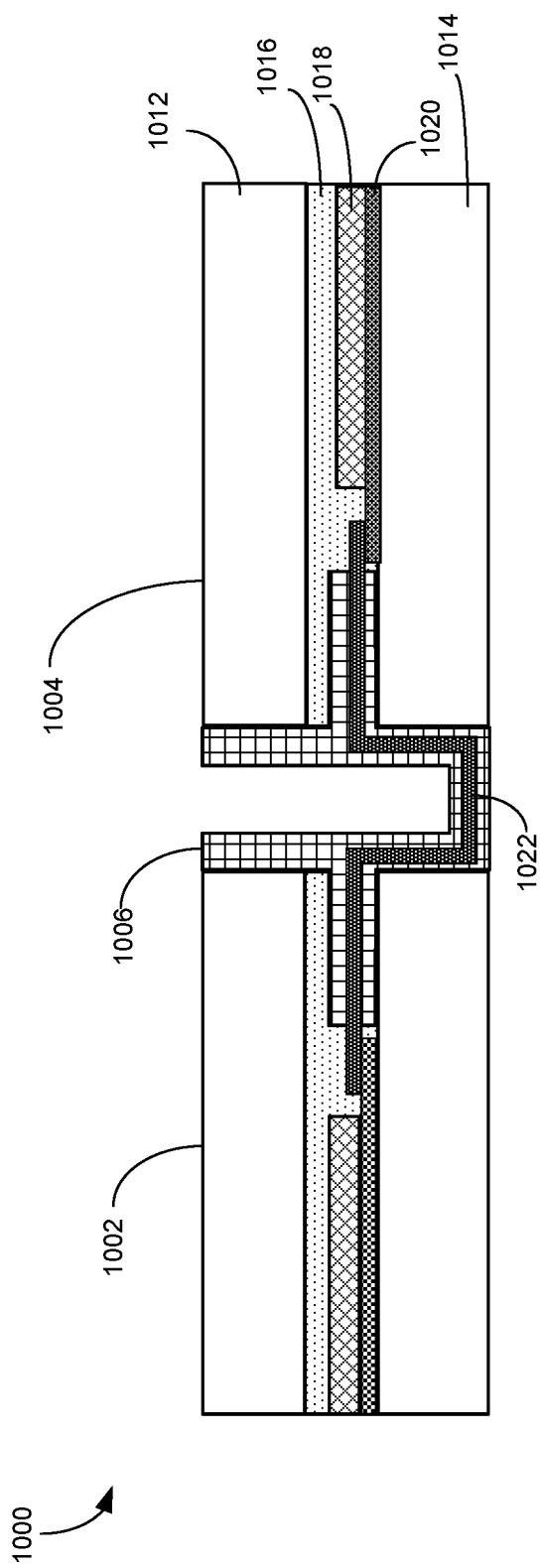
FIG. 10 shows a partial cross-sectional view of a multi-tile module, according to one embodiment.

FIG. 10 shows a partial cross-sectional view of a multi-tile module, according to one embodiment. Multi-tile module 1000 includes solar roof tiles 1002 and 1004 coupled to each other by tile spacer 1006. Each solar roof tile (e.g., solar roof tile 1004) can include a front cover 1012, a back cover 1014, an encapsulant layer 1016, a cascaded string 1018, and a pre-laid circuit 1020. More specifically, pre-laid circuit 1020 is attached to back cover 1014. Moreover, pre-laid circuit 1020 can be electrically coupled to cascaded string 1018.

Tile spacer 1006 can include a circuit component 1022 embedded inside its body, including both the base section and the wing sections of tile spacer 1006. In some embodiments, circuit component 1022 can include one or more metallic strips. The thickness of the wing section can be between 0.3 and 1 mm (e.g., 0.5 mm), and the thickness of the metallic strips embedded within tile spacer 1006 can be between 0.1 and 0.5 mm (e.g., 0.3 mm).

Edges of embedded circuit component 1022 can extend beyond the edges of the wings of tile spacer 1006 to come into contact with the pre-laid circuits (e.g., pre-laid circuit 1020) within each solar roof tile. As a result, electrical coupling can be established between the cascaded strings within the adjacent solar roof tiles. Depending on the configurations of the pre-laid circuits, in-series or in-parallel coupling between the cascaded strings can be achieved.

In the example shown in FIG. 10, encapsulant layer 1016 is mostly positioned on the front side of cascaded string 1018. Alternatively, an additional encapsulant layer can be placed on the back side of cascaded string 1018. However, in such a scenario, openings need be created on the back side encapsulant layer to facilitate electrical coupling between pre-laid circuit 1020 and cascaded string 1018.

Fabrication of a Photovoltaic Roof Tile

Figure 11:
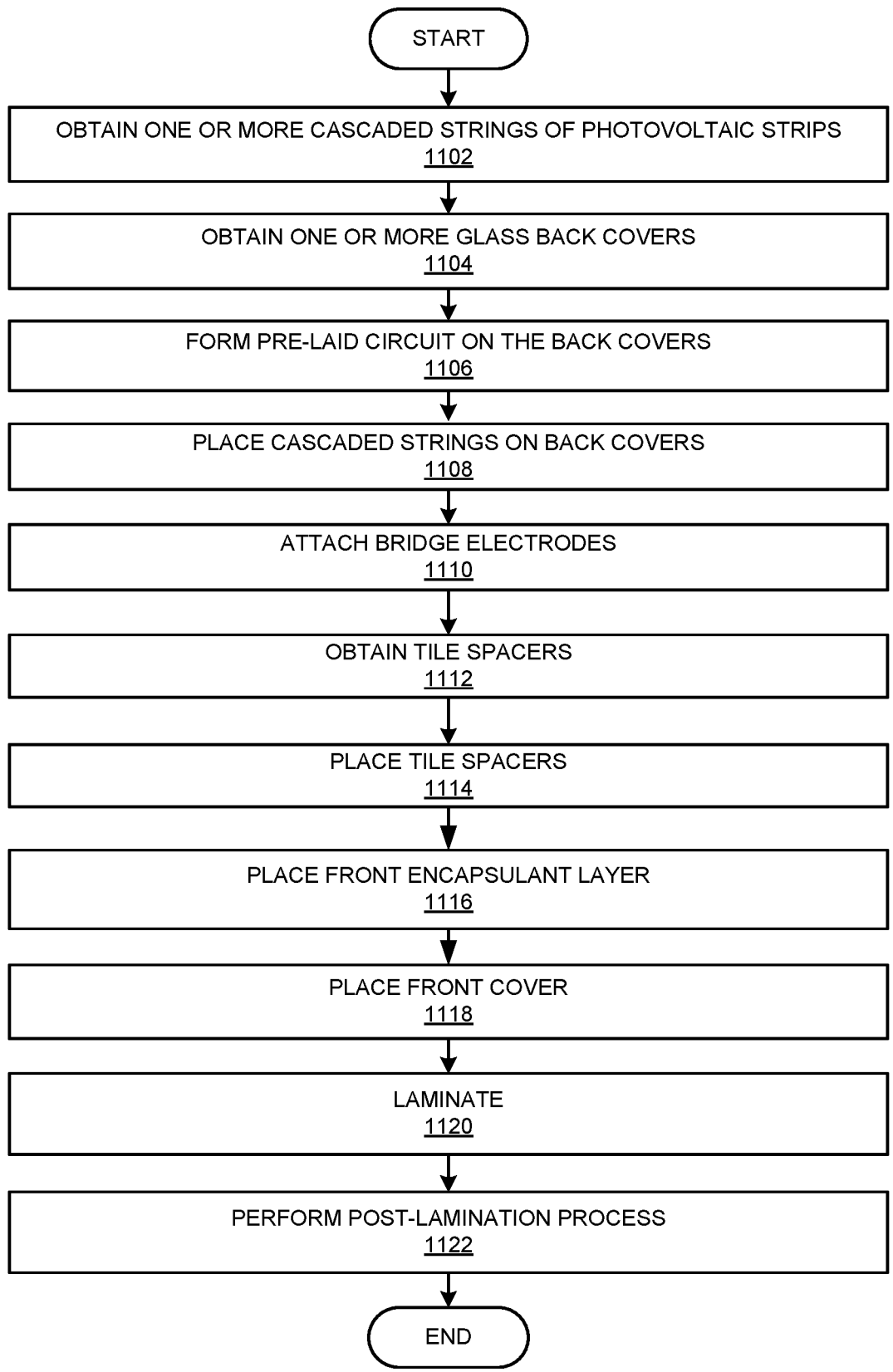
FIG. 11 presents a flowchart illustrating an exemplary process for fabricating a photovoltaic tile module, according to an embodiment.

FIG. 11 presents a flowchart illustrating an exemplary process for fabricating a photovoltaic tile module, according to an embodiment. The photovoltaic tile module can be a multi-tile module that includes multiple individual photovoltaic tiles coupled to each other via tile spacers. During fabrication, one or more cascaded strings of photovoltaic strips can be obtained (operation 1102). The photovoltaic strips can be obtained by dividing a standard square or pseudo-square solar cell into multiple pieces; and a string of strips can be formed by cascading multiple strips at the edges. The cascading forms a serial connection among the strips. In some embodiments, each individual solar roof tile may include one string, and each string can include six cascaded strips. Detailed descriptions about the formation of a cascaded string of photovoltaic strips can be found in U.S. patent application Ser. No. 14/826,129, entitled "PHOTOVOLTAIC STRUCTURE CLEAVING SYSTEM," filed Aug. 13, 2015; U.S. patent application Ser. No. 14/866,776, entitled "SYSTEMS AND METHODS FOR CASCADING PHOTOVOLTAIC STRUCTURES," filed Sep. 25, 2015; U.S. patent application Ser. No. 14/804,306, entitled "SYSTEMS AND METHODS FOR SCRIBING PHOTOVOLTAIC STRUCTURES," filed Jul. 20, 2015; U.S. patent application Ser. No. 14/866,806, entitled "METHODS AND SYSTEMS FOR PRECISION APPLICATION OF CONDUCTIVE ADHESIVE PASTE ON PHOTOVOLTAIC STRUCTURES," filed Sep. 25, 2015; and U.S. patent application Ser. No. 14/866,817, entitled "SYSTEMS AND METHODS FOR TARGETED ANNEALING OF PHOTOVOLTAIC STRUCTURES," filed Sep. 25, 2015; the disclosures of which are incorporated herein by reference in their entirety.

In some embodiments, instead of conductive paste, electrical and mechanical bonding between the adjacent strips at their corresponding edges can be achieved via adhesive conductive films. Detailed descriptions about the bonding of adjacent photovoltaic strips using adhesive conductive films can be found in U.S. patent application Ser. No. 16/007,599, entitled "CASCADED SOLAR CELL STRING USING ADHESIVE CONDUCTIVE FILM," filed Jun. 13, 2018, the disclosure of which is incorporated herein by reference in its entirety.

One or more glass back covers for solar roof tiles can be obtained (operation 1104), and pre-laid circuit can be formed on the back covers (operation 1106). In some embodiments, the pre-laid circuit can be formed by attaching (e.g., using an adhesive) individual metallic strips at desired locations on the back covers. To prevent unwanted electrical coupling, a metallic strip running across multiple cascaded strips or even multiple tiles can be wrapped by an insulation film with openings at one or more desired locations. In alternative embodiments, the pre-laid circuit can be formed by printing, or depositing using other metallization techniques (e.g., evaporation, sputtering, plating, etc.) metallic traces at desired locations of the back covers. Similarly, a metallic trace that runs across multiple cascaded strips can be covered by an insulation film with one or more openings formed at desired locations.

The previously prepared cascaded strings can then be placed onto the back covers (operation 1108). In some embodiments, a robotic arm with vacuum-enabled wafer pickers can pick up the cascaded strings and lay them on desired locations of the back covers. The cascaded strings should be arranged in such a way that the bottom edge busbar of a cascaded string overlaps a corresponding metallic strip or trace of the pre-laid circuit. Various alignment techniques (e.g., laser vision or computer vision) can be used to align the cascaded string. The coupling between the metallic strip or trace in the pre-laid circuit and the edge busbar of the cascaded string can be achieved using electrically conductive adhesive (ECA). Alternatively, no adhesive is needed because the rigid coupling between the front and back glass covers can sufficiently secure the metal-to-metal contact. Note that, in some embodiments, prior to laying down the cascaded strings, a back encapsulant layer can be placed on the back covers having the pre-laid circuit. This operation is not shown in FIG. 11. To ensure proper electrical coupling between the pre-laid circuit and the subsequently laid cascaded strings, the back encapsulant layer does not cover the metallic strips or traces that need to be coupled to the electrodes of the cascaded strings. To do so, openings can be created on the back encapsulant layer or the back encapsulant layer can be smaller than the back cover and cover only the center portion, leaving the bordering regions, including those metallic strips needing to couple to the cascaded strings, uncovered.

Subsequently, a bridge electrode can be attached to each cascaded string (operation 1110). More specifically, an edge of the back surface of the bridge electrode can stack on the top edge busbar of the cascaded string. If the bridge electrode includes an edge busbar on its back surface, such an edge busbar can overlap the top edge busbar of the cascaded string in a way similar to the cascading of two adjacent strips. Moreover, the contact pads on the other edge of the back surface can overlap a corresponding metallic strip or trace of the pre-laid circuit. The coupling between the bridge electrode and the edge busbar of a cascaded string can be similar to the coupling between two adjacent photovoltaic structures, which can involve a conductive paste. On the other hand, the coupling between the contact pads of the bridge electrode and the pre-laid circuit can be similar to the coupling between the bottom edge busbar of the cascaded string and the pre-laid circuit, which can involve ECA. In addition, it is also possible to not use adhesive at all, but to rely instead on the metal-to-metal contact for electrical coupling.

Specially designed tile spacers can be obtained (operation 1112). In some embodiments, a tile spacer can be formed by first forming (e.g., using a molding technique) upper and lower portions of the tile spacer and then placing one or more metallic strips between the upper and lower portions of the tile spacer in such a way that the metallic strips are sandwiched between the upper and lower portions of the tile spacer with their ends extending beyond either side of the tile spacer. In some embodiments, forming a tile spacer can involve placing, beforehand, one or more metallic strips inside a mold for the tile spacer, and then injecting molting thermal plastic (e.g., PVDF or PTFE) into the mold. The metallic strips can be shaped into a desired shape and placed at a desired location. Therefore, after cooling, a tile spacer with embedded metallic strips can be obtained. The length of the metallic strips can be designed such that the two ends of a metallic strip can extend beyond the two wings of the tile spacer.

The tile spacers can then be placed between adjacent tiles within the tile module (operation 1114). In some embodiments, the tile spacers can be placed in such a way that the base of a tile spacer snugly fits in the space between two adjacent back tile covers, with its two wings positioned above the back covers. More specifically, the metallic strips extending out of the wings can come into contact with the pre-laid circuit on the back tile covers, in a way similar to the one shown in FIG. 10. In some embodiments, conductive paste or film can be deposited onto the pre-laid circuit to facilitate electrical coupling between the metallic strips embedded in the tile spacer and the pre-laid circuit on the back covers.

Subsequently, a front encapsulant layer can then be placed on top of the cascaded string and the bridge electrode (operation 1116), and front glass covers can be placed on top of the front encapsulant layer (operation 1118). A lamination operation can be performed to encapsulate the cascaded strings along with the bridge electrodes between the front and back covers (operation 1120). A post-lamination process (e.g., trimming of overflowed encapsulant and attachment of the junction box and other roofing components) can then be performed to complete the fabrication of a PV roof tile (operation 1122). In some embodiments, a junction box can access the pre-laid circuit via a through hole located on the glass back cover. A detailed description of the junction box and the coupling between the junction box and the inter-tile electrical connection can be found in U.S. patent application Ser. No. 15/905,551, entitled "SYSTEM AND METHOD FOR COUPLING JUNCTION BOX TO SOLAR ROOF TILES," filed Feb. 26, 2018, the disclosure of which is incorporated herein by reference in its entirety.

The foregoing descriptions of various embodiments have been presented only for purposes of illustration and description. They are not intended to be exhaustive or to limit the present system to the forms disclosed. Accordingly, many modifications and variations will be apparent to practitioners skilled in the art. Additionally, the above disclosure is not intended to limit the present system.

What is claimed is:

1. A photovoltaic roof tile module, comprising at least:
a first photovoltaic roof tile comprising a first front glass cover, a first back cover and a first plurality of photovoltaic structures disposed between the first front glass cover and the first back cover; and
a second photovoltaic roof tile positioned adjacent to the first photovoltaic roof tile, the second photovoltaic roof tile comprising a second front glass cover, a second back cover and a second plurality of photovoltaic structures disposed between the first front glass cover and the first back cover; and
a spacer positioned between the first photovoltaic roof tile and the second photovoltaic roof tile and in direct contact with a surface of the first photovoltaic roof tile, wherein the spacer comprises a thermal plastic body and a single piece metallic strip embedded within the thermal plastic body; and
wherein a first end of the single piece metallic strip extends out of the thermal plastic body and between the first front glass cover and the first back cover and a second end of the single piece metallic strip extends out of the thermal plastic body and between the second front glass cover and the second back cover to electrically couple the first plurality of photovoltaic structures to the second plurality of photovoltaic structures.

2. The photovoltaic roof tile module of claim 1, wherein a respective photovoltaic structure of the first plurality of photovoltaic structures comprises a first edge busbar positioned near an edge of a first surface and a second edge busbar positioned near an opposite edge of a second surface, and wherein the first plurality of photovoltaic structures are arranged in such a way that the first edge busbar of a first photovoltaic structure overlaps the second edge busbar of an adjacent photovoltaic structure, thereby resulting in the first plurality of photovoltaic structures forming a cascaded string with the first plurality of photovoltaic structures coupled to each other in series.

3. The photovoltaic roof tile module of claim 2, wherein the single piece metallic strip is a first metallic strip and wherein positive and negative polarities of the cascaded string are respectively coupled to the first metallic strip and a second metallic strip, embedded within the thermal plastic body, wherein the second metallic strip is a single piece metallic strip and is separate and distinct from the first metallic strip.

4. The photovoltaic roof tile module of claim 1, wherein the spacer is in direct contact with the second photovoltaic roof tile.

5. The photovoltaic roof tile module of claim 1, wherein the surface of the first photovoltaic module in direct contact with the spacer faces the second photovoltaic module.

6. The photovoltaic roof tile module of claim 1, wherein the thermal plastic body comprises a base and two wings extending from the base in opposite directions, wherein a first wing of the spacer is positioned between the front and back covers of the first photovoltaic roof tile, and wherein the ends of the single piece metallic strip extend beyond the edges of the wings.

7. The photovoltaic roof tile module of claim 1, wherein at least a portion of the thermal plastic body of the spacer does not extend between the first front glass cover and the first back cover and does not extend between the second front glass cover and the second back cover.

8. The photovoltaic roof tile module of claim 1, wherein the first and second back covers each comprise a glass substrate and wherein the first plurality of photovoltaic structures comprises a pre-laid circuit attached to the glass substrate of the first back cover, the pre-laid circuit comprising:

metallic strips attached to the glass substrate via conductive paste; or metallic traces printed onto the glass substrate.

9. The photovoltaic roof tile module of claim 1, wherein the single piece metallic strip comprises Cu.

* * * * *